United States Patent
Shaw et al.

(10) Patent No.: US 10,117,116 B1
(45) Date of Patent: Oct. 30, 2018

(54) SYSTEM AND METHOD SUPPORTING DELIVERY OF NETWORK ACCESSIBLE SERVICES TO CONNECTED DEVICES OF A LOCAL ENVIRONMENT

(71) Applicant: AT&T INTELLECTUAL PROPERTY I, L.P., Atlanta, GA (US)

(72) Inventors: Venson Shaw, Kirkland, WA (US); Sangar Dowlatkhah, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/498,985

(22) Filed: Apr. 27, 2017

(51) Int. Cl.
*H04W 24/04* (2009.01)
*H04W 8/00* (2009.01)
*H04W 76/02* (2009.01)
*H04W 24/02* (2009.01)
*H04L 12/46* (2006.01)
(Continued)

(52) U.S. Cl.
CPC ......... *H04W 24/04* (2013.01); *H04L 12/4633* (2013.01); *H04W 8/005* (2013.01); *H04W 24/02* (2013.01); *H04W 52/0209* (2013.01); *H04W 76/02* (2013.01); *H04W 76/10* (2018.02)

(58) Field of Classification Search
None
See application file for complete search history.

(56) References Cited

U.S. PATENT DOCUMENTS 9,137,118 B2  9/2015  Himura et al.
9,460,286 B1  10/2016  Felstaine et al.
9,667,509 B1  5/2017  Levi et al.
(Continued)

FOREIGN PATENT DOCUMENTS

EP   3202086 A1   8/2017
WO   2015184044   12/2015
(Continued)

OTHER PUBLICATIONS

Bizanos, Nikos et al., "SDN and virtualization solutions for the Internet of Things: A survey", IEEE Access 4., Sep. 9, 2016, 5591-5606.
(Continued)

*Primary Examiner* — Brian Roberts
(74) *Attorney, Agent, or Firm* — Guntin & Gust, PLC; Ralph Trementozzi

(57) ABSTRACT

Aspects of the subject disclosure may include, for example, monitoring a control plane of a service provider network including messages that facilitate network access by local equipment to subscribed services. A data plane managed by the network and separate from the control plane is also monitored. The data plane facilitates an exchange of user data between the connected devices, the network and the subscribed services. Local equipment are identified based on the monitoring of the control plane, and local network connectivity is established between the processing system and the local equipment. A common communication channel is established between the processing system and the network, wherein network access to the subscribed services is based on an exchange of the user data via the common communication channel. Other embodiments are disclosed.

20 Claims, 10 Drawing Sheets

(51) Int. Cl.
*H04W 52/02* (2009.01)
*H04W 76/10* (2018.01)

(56) References Cited

U.S. PATENT DOCUMENTS

| | | | |
|---|---|---|---|
| 9,674,693 B2 | 6/2017 | Kompella et al. | |
| 2014/0003232 A1* | 1/2014 | Guichard | H04L 67/16 370/230 |
| 2014/0173018 A1* | 6/2014 | Westphal | H04L 41/0823 709/213 |
| 2014/0201374 A1* | 7/2014 | Ashwood-Smith | H04L 49/70 709/226 |
| 2014/0280835 A1* | 9/2014 | Pruss | H04L 41/0206 709/223 |
| 2015/0049631 A1* | 2/2015 | Heron | H04L 45/02 370/254 |
| 2015/0207724 A1* | 7/2015 | Choudhury | H04L 41/12 370/255 |
| 2015/0288541 A1 | 10/2015 | Fargano et al. | |
| 2016/0173338 A1* | 6/2016 | Wolting | H04L 41/145 709/223 |
| 2016/0212017 A1 | 7/2016 | Li et al. | |
| 2017/0063714 A1 | 3/2017 | Xiang | |
| 2017/0070412 A1 | 3/2017 | Kanevsky | |
| 2017/0086111 A1 | 3/2017 | Vrzic | |
| 2017/0102957 A1 | 4/2017 | Marquardt et al. | |
| 2017/0104609 A1 | 4/2017 | McNamee et al. | |
| 2017/0141973 A1 | 5/2017 | Vrzic | |
| 2017/0142206 A1 | 5/2017 | Kodaypak et al. | |
| 2017/0150399 A1 | 5/2017 | Kedalagudde et al. | |
| 2017/0185494 A1 | 6/2017 | Yang et al. | |

FOREIGN PATENT DOCUMENTS

| | | |
|---|---|---|
| WO | 2016192636 A1 | 12/2016 |
| WO | 2017018965 | 2/2017 |
| WO | 2017054841 | 4/2017 |
| WO | 2017058274 A1 | 4/2017 |
| WO | 2017123277 A1 | 7/2017 |

OTHER PUBLICATIONS

Cranford, Nathan , "The key role of MANO in network functions virtualization", RCR Wirelss News, rcrwireless.com., Jun. 19, 2017, 1-5.

Hakiri, Akram et al., "Leveraging SDN for The 5G Networks: Trends, Prospects and Challenges", arXiv preprint arXiv:1506. 02876, Jun. 8, 2015, 1-24.

Haque, Israat T. et al., "Wireless software defined networking: A survey and taxonomy", IEEE Communications Surveys & Tutorials 18.4., 2016, 1-25.

Ma, Zheng , "Key techniques for 5G wireless communications: network architecture, physical layer, and MAC layer perspectives", Science China Information Sciences 58.4., Apr. 2015, 1-20.

* cited by examiner

100

200

SYSTEM AND METHOD SUPPORTING DELIVERY OF NETWORK ACCESSIBLE SERVICES TO CONNECTED DEVICES OF A LOCAL ENVIRONMENT

FIELD OF THE DISCLOSURE

The subject disclosure relates to a system and method supporting delivery of network accessible services to connected devices of a local environment.

BACKGROUND

There are an expanding number and variety of network-enabled devices that can be used to remotely access applications, services and information, to interact with others, and to monitor or control local and/or remote processes. It is common to have clusters of such connected or smart devices, e.g., at homes, businesses, public places, and so forth. Some clusters can be mobile, e.g., on a user's person, and/or in a user's car, public transportation, and the like. These clusters of devices are sometimes referred to as a local ecosystem, and can go well beyond desktop, laptop, and tablet computers to encompass the full range of endpoints with which humans and/or machines might interact.

Devices are increasingly connected to back-end systems through various networks, but often operate in isolation from one another. As technology evolves, connection models will likely expand, flow into one another and allow for a greater cooperative interaction between devices. Cooperative interactions between devices can provide applications across business, industry, law enforcement, military, health, and consumer markets.

BRIEF DESCRIPTION OF THE DRAWINGS

Reference will now be made to the accompanying drawings, which are not necessarily drawn to scale, and wherein.

DETAILED DESCRIPTION

Figure 1:
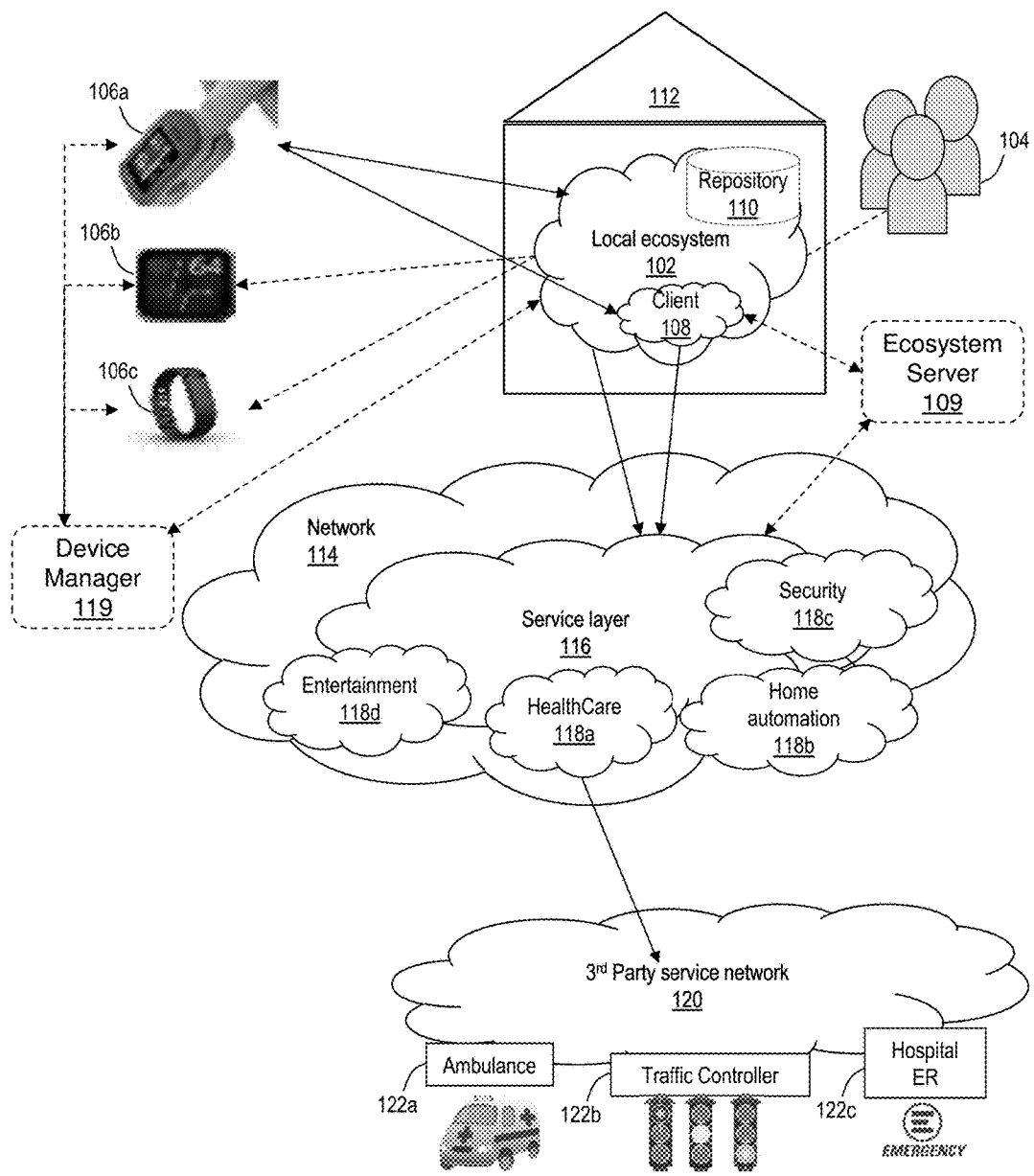
FIG. 1 depicts an illustrative embodiment of an electronic services ecosystem.

The subject disclosure describes, among other things, illustrative embodiments for a system and process that supports delivery of network accessible services to connected or smart devices of a local environment, sometimes referred to as a local ecosystem. Examples of the types of support include, without limitation, one or more of: discovering identities of local connected devices; providing a reliable, constant connection to a core portion of a service provider network and/or to subscribed network-accessible, e.g., digital services; providing an alternative means of communication; facilitating failovers, backups, and/or general redundancies of operation of the connected devices and/or network access, facilitating power management of connected devices; and facilitating other value added services among one or more of the connected devices. Other embodiments are described in the subject disclosure.

Generally speaking, a local ecosystem provides a mechanism that enables a real-time coordinated operation of one or more connected devices and/or services in association with a user and/or group of users. The local ecosystem can include or otherwise be serviced according to one or more virtual network functions. The local ecosystem can also include one or more connected devices, one or more digital services, or any combination of connected devices and/or services associated with an individual and/or group of individuals.

In more detail, an ecosystem includes an arrangement of connected devices that support a delivery of one or more services to a user or group of users. The connected devices can include, without limitation, network accessible devices, such as mobile devices and/or stationary devices that can be accessed by a wired network, a wireless network or both. In general, the connected devices are configured to include a normal operating mode, in which one or more of the connected devices function with little or no interaction with an ecosystem controller. Information obtained by way of control, signaling and/or user data communications between the connected devices, the provider network and/or subscribed services are processed and stored, at least in part, locally with the devices of the ecosystem.

Operations conditions can be identified based on the control, signaling and/or user data traffic alone or in combination with one or more operational parameters and/or configuration of the connected devices. In response to detection of a predetermined condition, such as an abnormal or emergency condition, the local support system controller queries a local repository to determine an associated rule, preference and/or restriction for particular the user or group. The local support system controller can automatically connect with a service layer to instantiate one more services based on the preference and/or restriction. Accordingly, services can be provided to the user or group automatically and seamlessly in response to detection of an abnormal condition.

One or more aspects of the subject disclosure include a device that includes a processing system having a processor and a memory that stores executable instructions. The instructions, when executed by the processing system, facilitate performance of operations that include monitoring, on-premises, a control channel of a service provider network, wherein the control channel includes control messages that facilitate network access by on-premises equipment, including a number of connected devices, to a number of subscribed service functions that facilitate a delivery of subscribed services to the number of connected devices by way of a core portion of the service provider network. A data channel managed by the service provider network and separate from the control channel is monitored on premises, wherein the data channel facilitates an exchange of user data between the number of connected devices, the core portion of the service provider network and the number of subscribed service functions. The on-premises equipment are discovered based on the monitoring of the control channel and local network connectivity is established between the processing system and the on-premises equipment. A common communication channel is also established between the processing system and the core portion of the service provider network, wherein the delivery of subscribed services is based on an exchange of the user data via the common communication channel. In at least some embodiments, the common communication channel is maintained in an active state without regard to the exchange of user data.

One or more aspects of the subject disclosure include a process that includes on-premises monitoring of a control channel of a service provider network by a processing system, wherein the control channel includes control messages that facilitate network access by on-premises equipment including a number of connected devices to a number of subscribed services by way of a core portion of the service provider network. A data channel managed by the service provider network and separate from the control channel is also monitored on-premises, wherein the data channel facilitates an exchange of user data between the number of connected devices, the core portion of the service provider network and the number of subscribed services. The on-premises equipment is identified based on the monitoring of the control channel. Local network connectivity is established between the processing system and the on-premises equipment, and common transport channel is also established between the processing system and the core portion of the service provider network. The network access to the subscribed services is based on an exchange of the user data via the common transport channel. In at least some embodiments, the common transport channel is maintained in an active state by the processing system, without regard to the exchange of user data.

One or more aspects of the subject disclosure include a machine-readable storage device, including executable instructions that, when executed by a processing system including a processor, facilitate performance of operations. The operations include monitoring a control plane of a service provider network including messages that facilitate network access by local equipment to subscribed services by way of the service provider network, and monitoring a data plane managed by the service provider network and separate from the control plane. The data plane facilitates an exchange of user data between the connected devices, the service provider network and the subscribed services. Local equipment are identified based on the monitoring of the control plane, and local network connectivity is established between the processing system and the local equipment. A common communication channel is established between the processing system and the service provider network, wherein network access to the subscribed services is based on an exchange of the user data via the common communication channel. In at least some embodiments, the common communication channel is maintained in an active state without regard to the exchange of user data.

FIG. 1 depicts an illustrative embodiment of a communication system 100 including a local ecosystem. According to the illustrative embodiment, a local ecosystem 102 is associated with a user and/or a group of users 104, e g, family members, employees, students. The local ecosystem 104 includes one or more connected devices 106a, 106b, 106c, generally 106, one or more client applications 108, and a repository 110. One or more of the local ecosystem 102, the connected devices 106, the client(s) 108, and the repository 110 can be located at and/or otherwise associated with a particular location 112, such as a residence, a place of business, a retail outlet, a public venue, such as a public building, a park, an arena and the like. Alternatively or in addition, the particular location 112 can include a vehicle, such as a cruise ship, a train, an automobile, an airplane, and the like.

One or more networks 114 provide network connectivity between at least some of the various components and devices of the communication system. The network 114 can include a service provider network, such as a broadband service provider, a cable provider, satellite service provider, and the like. The network 114 can include a public network, a private network, e.g., a private LAN, an enterprise network, and combinations of public and private networks. In at least some embodiments, the network 114 includes a mobile wireless network, e.g., a mobile broadband service provide or a mobile carrier network. More generally, the network 114 can include combinations of one or more of the foregoing networks, and in at least some instances includes the Internet, the World Wide Web, and the like.

The network 114 can include a service layer 116 that supports applications running at a network application layer and above, to provide data storage, manipulation, presentation, communication and/or other capabilities. The service layer 116 can be implemented using a client-server and/or peer-to-peer architecture based on application layer network protocols. Services supported by the service layer 116 can be provided by a server component running on one or more computers and accessed via a network by client components running on the same or different machines. Examples of network services include, without limitation, streaming media, Video on Demand, Voice over IP, video telephony, instant messaging, e-mail, file server, online gaming, directory services, simple network management protocol, and the like. Alternatively or in addition, the services can include virtually any service that utilizes one or more of the underlying network services. Sometimes, such services are referred to as over-the-top services.

In the illustrative example, the service layer 116 includes or otherwise supports one or more of entertainment services 118d, healthcare services 118a, home automation services 118b, and security services 118c, generally referred to herein as services 118. The services 118 can be provided by the same or different service provider as the network service provider. In at least some embodiments, the services 118 include a third party service network 120. It is understood that such third party service networks 120 can provide services to the user or group directly, or in association with services 118 of the service layer 116.

In general, connected devices 106 can include, without limitation, electronic devices generally connected to other devices 106 and/or networks 114. The connected devices 106 can include, so called, smart devices, e.g., that can operate to some extent interactively and autonomously. Examples of connected devices 106 include, without limitation, home and/or office automation devices (or smart home/office devices), such as, control and automation of lighting, heating, ventilation, air conditioning (HVAC), appliances, security, entertainment, and the like. Other examples include personal monitoring devices. Examples of personal monitoring devices can include, without limitation, infant monitors and/or pet monitors, e.g., monitoring one or more of visual aspects using a camera, and/or one or more audio aspects using a microphone and/or motion sensor.

One or more of the connected devices 106 can be communicatively coupled to other devices 106 and/or networks 114 via one or more of wires, cables, fiberoptics, one or more wireless protocols, such as Bluetooth, NFC, Wi-Fi, 3GPP protocols, such as 3G, 4G LTE, 5G, and the like. The devices 106 can be mobile, such as mobile wireless devices, fixed, as in hardwired and/or stationary, and/or any combination of mobile and fixed.

In some embodiments, monitoring devices 106 can include one or more biometric sensors. Examples of biometric sensors 106 can include, without limitation, blood pressure monitors, blood oxygen monitors, blood flow monitors, thermometers, heart rate or pulse monitors, blood glucose monitors, brain activity monitors, e.g., electroencephalography (EEG) measuring and/or recording electrical activity in the brain, heart monitors, e.g., Electrocardiography (ECG or EKG) monitoring and/or recording electrical activity in the heart, and the like. One or more of the connected devices 106 can be stationary, e.g., in a user's home 112 and/or a medical center, such as a trauma center. Alternatively or in addition, one or more of the connected devices can be mobile, e.g., wearable upon a user 104 and/or provisioned in a vehicle, such as an ambulance and/or medivac helicopter.

In at least some embodiments, the connected devices 106 can include general health monitors, such as any of the foregoing biometric sensors and/or an activity monitor 106c. The activity monitor 106c can detect movement, e.g., according to one or more of position sensing, direction or bearing, distance and/or acceleration. For example, accelerometers can be configured to monitor user activity, such as walking, jogging or running and/or general exercise. The accelerometer can operate alone or in combination with other devices, such as an altimeter and/or a location detector, such as a GPS receiver. Such configurations can track one or more of position, e.g., location, movement, speed, climb, descent, and the like. Examples of operation of an ecosystem, such as the illustrative example, are disclosed in commonly owned, U.S. patent application Ser. No. 15/457,521, entitled "User-Centric Ecosystem for Heterogeneous Connected Devices," filed on Mar. 13, 2017, and incorporated herein by reference in its entirety.

It should be understood that connected devices 106 can include any device, including those devices that participate in a machine architecture referred to as the Internet of Things (IoT), in which objects that form part of everyday lives can communicate through various networks. Accordingly, the connected devices can include, without limitation, appliances in a user's home, machinery in a factory setting, utility meters, vehicles, and the like.

It is further understood that one or more connected devices 106 can be associated with different ecosystems. The ecosystems can be differentiated by one or more of time, user association and/or location. For example, a home security system and/or home entertainment system can be associated with multiple members of a household. In some embodiments, a common ecosystem can be configured to which different members of the same household are affiliated as a common group of users. In a group application, a common set of preferences and/or restrictions can be associated with the group within the repository 110. Accordingly, the same actions, e.g., instantiating the same applications can result from a notification of an abnormal condition at a particular location, e.g., the home or office of the user group. Depending upon the nature of the instantiated applications, one or all of the members of the group may, by prior association with the group, experience common consequences of the instantiated applications. For example, all members of the group might receive a common message in response to the security system monitoring an abnormal situation.

In some embodiments, the same actions, e.g., instantiating the same applications in response to notification of an abnormal condition is enacted with respect to selected members of the group. Such selection of members can be based on a member's location, e.g., at the home or office 112 associated with the abnormal condition. Those members not at the home or office 112 need not be bothered by the instantiated applications. For example, any member of the group at the location 112 might receive a common message in response to a determination that a user is agitated, or bored with current entertainment selection. In response, an entertainment application can be instantiated, such as a particular VOD service and/or gaming service that provides messages and/or otherwise interacts with users at the location 112. Interaction might be by text messages, emails, video chats and the like to address the detected agitation or boredom of those at the location 112, without bothering group members who are not at the location 112.

Figure 2:
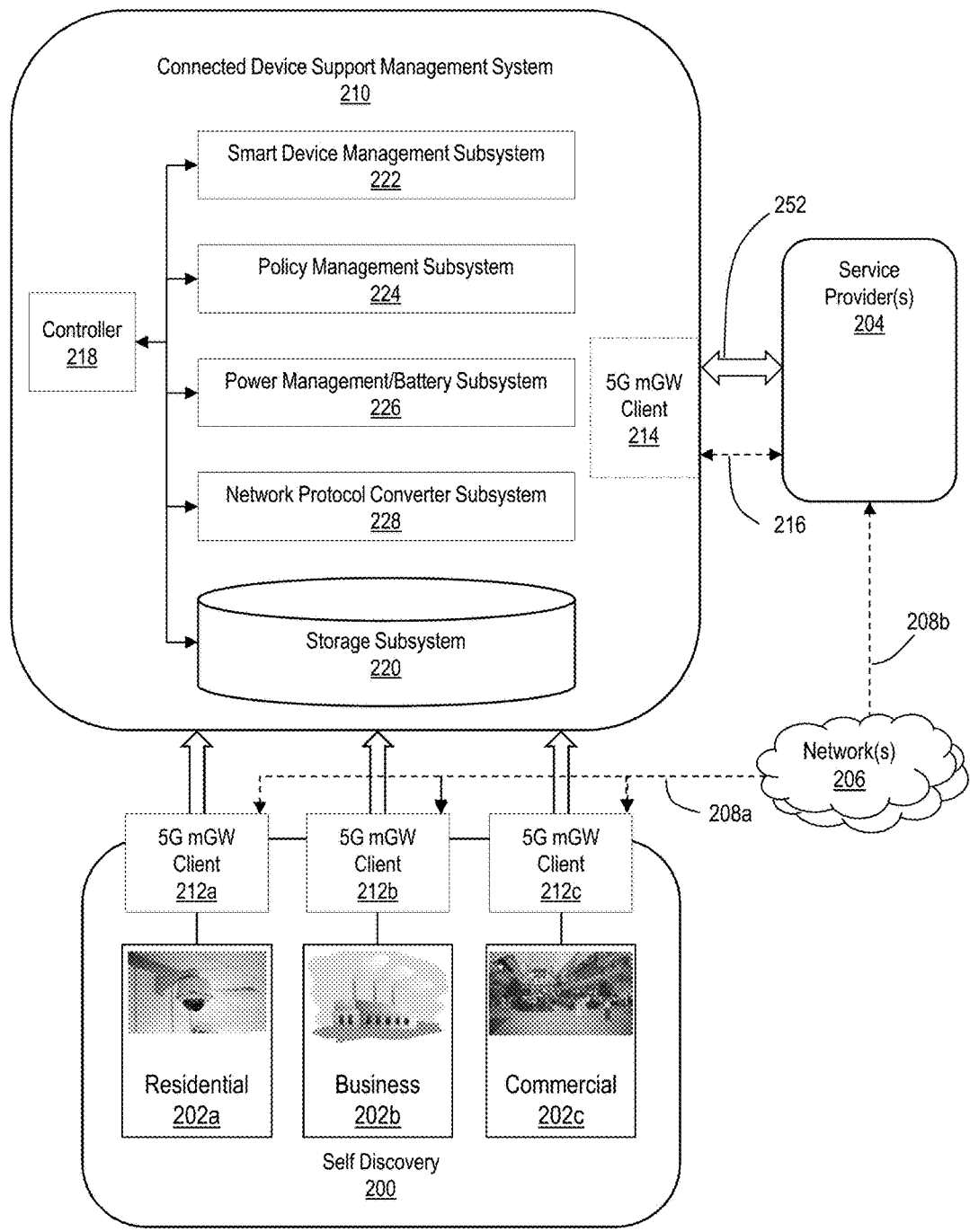
FIG. 2 depicts an illustrative embodiment of a local connected device support system.

FIG. 2 depicts an illustrative embodiment of a local connected device support system 200. Example ecosystems of connected devices include one or more of a residential ecosystem 202a, a business ecosystem 202b, and a commercial ecosystem 202c (generally 202). This is by no means a complete list, and it is envisioned that some ecosystems 202 might include combinations of one or more categories, such as residential 202a and business 202b for home office scenarios, business 202b and commercial 202c for a retail business scenario, as well as a personal ecosystems, public ecosystems and so on, alone or in combination with these examples.

In some embodiments, the ecosystems 202 include one or more network accessible, connected, or so-called smart devices. It is understood that in some scenarios, the connected devices of a common ecosystem are proximate to each other, e.g., in, at or about a common location, such as a home, a business, a campus, or the like. As such, the devices may or may not share commonalities, such as a common power source, a common network connection, a common space, common heating, ventilation and/or air conditioning (HVAC), common premises, and the like. It is further understood that interruptions to any one of these shared features can wreak havoc upon operation of the individual connected devices, the entire ecosystem, and others that rely upon various services provided or otherwise accessed by the devices.

Continuing with the illustrative example, connected devices of the example ecosystems 202 are in communication with equipment of one or more service providers 204, by way of one or more networks 206. Network connectivity is illustrated by dashed lines 208a between the various ecosystems 202 and the networks 206, and dashed lines 208b between the networks 206 and the equipment of the service providers 204. The network connections can include any suitable means of network access, including, but not limited to the various examples provided herein. In the illustrative example, the networks are referred to what is generally understood to be 5G networks.

5G networks generally provide separation of control signaling from user data. Control signaling used in establishing and maintaining network services, is sometimes referred to as a "control plane," whereas, user data, e.g., transferred between the devices and service provider equipment 204 and/or subscribed applications is sometimes referred to as a "user plane." At least a portion of a 5G network, e.g., a network core portion, can be cloud based, with a high degree of network function virtualization for scalability. Separation allows control- and user-plane resources to be scaled independently, allows them to be established in different locations, and supports migration to cloud-based deployments. For example, software defined networking can be used to provide flexibility in networking, e.g., providing for dynamic orchestration of network resources having a modular and highly resilient base architecture. It is envisioned that 5G networks will support a variety of access networks, such as 3GPP access, e.g., LTE, WiFi, and other non-3GPP technologies.

It is envisioned that other characteristics of 5G will include network slicing. Network "slices" can include multiple logical networks created on top of a common shared physical infrastructure. Accordingly, networks can be logically separated, with each slice providing customized connectivity and multiple, if not all, slices running on a common shared infrastructure. A network instance can be established using different network functions that are adapted, e.g., optimized to deliver a specific service. One slice may be designed for mobile broadband services, e.g., providing access to LTE, evolved LTE and NX devices, whereas another slice another may be designed for an industry application with an optimized core network control plane, different authentication schemes, and lightweight user plane handling.

In at least some embodiments, the system 200 include one or more management gateways 212a, 212b, 212c (generally 212). The management gateways 212 can be provided, in a networking sense, between the ecosystems and equipment of the service providers 204. In the illustrative embodiment, the residential ecosystem 202a is in communication with a residential 5G management gateway client 212a, which is in further communication with the equipment if the service providers 204 via the network(s) 206 and primary network connectivity 208. Likewise, the business ecosystem 202b and the commercial ecosystem 202c are in respective communication with a business 5G management gateway client 212b and a commercial 5G management gateway client 212c, which are in further communication with the equipment if the service providers 204 via the network(s) 206 and primary network connectivity 208. In this configuration, connected devices of the ecosystems 202 access subscribed services and general network connectivity via the primary network connectivity 208, including exchanges of control plane and user plane traffic.

The local connected device support system 200 includes a local connected device support management system 210. The support management system 210 is in network communication with one or more of the ecosystems 202. For example, the support management system 210 is in communication with one or more of the the 5G management gateways 212 supporting one or more of the ecosystems 202. It is envisioned that in at least some scenarios, the support management system 210 includes a management gateway client 214 (shown in phantom). Alternatively or in addition, the support management system 210 engages in network communications with equipment of the one or more service providers 204.

In some embodiments, the network communication between the support management system 210 and the equipment of the service providers 204 can be over the same networks 206, e.g., using the same or different primary network connectivity. Alternatively or in addition, this network communication can be accomplished over different networks over a secondary or backup connectivity 216. Through provision and management of the backup connectivity 216, the support management system 210 provides a reliable, constant connection to a core portion of a service provider network and/or to subscribed network-accessible, e.g., digital services.

In at least some embodiments, the support management system 210 discovers identities of local connected devices, e.g., including one or more of the management gateway clients 212 and/or connected devices of the one or more ecosystems 202. Having discovered the connected devices, the support management system 210 offers access to the reliable, constant connection to the core portion of the service provider network and/or to the subscribed digital services. In some embodiments, discovery of the connected devices of an ecosystem 202 can occur automatically, e.g., by monitoring network activity of the connected devices. For example, control plane signals can identify one or more of device identification numbers, device network addresses, device capabilities, device status, e.g., active, standby, offline, fault, and the like. Alternatively or in addition, data plane messages can also include one or more indicia directly, e.g., by way of network addresses, and/or inferentially, e.g., by observing active network user data traffic, or lack thereof.

It is envisioned in at least some embodiments, discovery of connected devices of any ecosystem 202 can be discovered according to a predetermined network configuration, e.g., in a network configuration file or table, by a network definition file or table, by a subscriber identification and/or subscribed services file or table, and the like. In some embodiments, the support management system 210 includes a user interface and/or user access from a remote user interface, such as a Web portal, to monitor and/or control various aspects of the support management system 210, e.g., including identification and/or modification of previously identified connected devices of supported ecosystems 202.

In more detail, the support management system 210 includes a controller 218 and a storage subsystem 220. Alternatively or in addition, the support management system 219 includes one or more of a smart device management subsystem 222, a policy management subsystem 224, a power management subsystem 226, and a network protocol converter subsystem. The support management system 210 facilitates access of one or more of the various subsystems 220, 222, 224, 226, 228, and/or the controller 218 with one or more of connected devices/sensors of an ecosystem 202, a management gateway 212 of the ecosystem and/or equipment of the service provider. Such connectivity can be accommodated in a direct senses between the subsystem 220, 222, 224, 226, 228 and the devices of an ecosystem 202 and/or with the equipment of the service provider 204. Alternatively or in addition, the connectivity can be accommodated via one or more of the controller 218 and/or the management gateway 214 o the support management subsystem 210.

The smart device management subsystem 222 can be adapted to communicate with device and/or sensor modules of an ecosystem 202. This can include communicating directly to a device/sensor and/or its bridge and/or gateway, which may be proprietary. Accordingly, the smart device management subsystem 222 can provide a secondary, e.g., a redundant, point of contact to the device/sensor regardless of manufacturer and/or protocol.

In some embodiments, the smart device management subsystem 222 includes logic that can be applied to operation of one or more of the devices/sensors of one or more of the ecosystems 202. For example, the smart device management subsystem 222 can apply one or more rules based on observed and/or reported conditions. The conditions can include, without limitation, operational status of any of the devices/sensors, data received and/or reported by any of the devices/sensors, and/or other inputs. Other inputs can include, without limitation, time of day, presence status of users and/or of the devices/sensors of the ecosystem 202, predetermined user preferences, reported emergencies, preprogrammed schedules, time of day, day of week, location(s), reported, measured or otherwise, of the devices/sensors, or of environmental conditions observed by the devices/sensors, and the like.

Emergencies can be determined by monitoring environmental conditions measured or otherwise sensed by the devices/sensors. Environmental conditions can include, without limitation, intruder alarm status, fire or smoke sensor status, presence status, sound, light, heat, motion, vibration, and the like. It is also understood that environmental conditions can include biometric sensor status, such as blood pressure, blood sugar, blood oxygen level, heart rate, pulse, temperature, and the like.

The smart device management subsystem can apply predetermined logic or rules based on such monitored environmental conditions, e.g., contacting a medical professional and/or emergency service in response to a monitored health condition, contacting security, e.g., police, in response to a detected intruder, contacting fire in response to smoke alarms, and the like. Application of such logic or rules can include initiating one or more of connected device actuations, connected device control, initiation of network connections, e.g., placing a VoIP call to a user and/or external service.

The policy management subsystem 224 facilitates application of one or more policies. The policies can be directed to operation of one or more of the individual connected devices and/or sensors of the supported ecosystems 202. For example a type and/or amount of data collected from one or more devices on premises cab be modified depending upon a policy. The policy can be predetermined, e.g., based on a consumer preferences, and/or a service provider's policy. Alternatively or in addition, the policies can be directed to interaction of individual connected devices and/or sensors of the supported ecosystems 202 with other devices/sensors and/or with other external systems. In at least some embodiments, the policies can be applied to operation of the support management system and/or one or more of the various subsystems 220, 222, 224, 226, 228.

Policies can be associated with one or more of service providers, device manufacturers, users, utility companies, network operators, and in some instances, with other third parties. For example, policies can be developed as a service and provided to users of the support management system 210. Such policies can be tailored to specific ecosystems 202 and/or subscribed services. Alternatively or in addition, such policies can be provided in a general sense, e.g., having modules for various connected devices/applications.

Policies can be determined based on goals of any of the foregoing. For example, goals may include one or more of increasing reliability, conserving power consumption, e.g., battery life of mobile devices, minimizing network access and/or service provider costs, e.g., by coordinating operation of the devices/sensors and/or associated network traffic as appropriate.

In at least some embodiments, the smart device management subsystem 210 can monitor one or more of primary network connectivity 208 and or electrical power status of a premises and/or of one or more devices/sensors of any of the ecosystems 202 being supported. The Power management/battery subsystem 226 can be adapted to monitor and/or manage power consumption of some or all connected devices of a particular ecosystem and/or premises. Power consumption can be monitored by direct reporting by the particular devices, e.g., in response to a query from the power management subsystem 226. Alternatively or in addition, power consumption can be inferred from one or more of device status, device activity, including a historical record of device activity determined by the power management subsystem 226. Alternatively or in addition, the power consumption can be inferred from network activity of one or more of control plane and/or user plane traffic. Devices engaging in a high volume of traffic would be expected to consume power at a greater rate than inactive devices.

Generally, references to communication devices or equipment being on-premises can include communication devices and/or other equipment that are located at a premises including a residence, an enterprise building, a campus environment including multiple buildings in close proximity, a public facility, e.g., a shopping mall or a stadium, and the like. Although references are made to premises, it is understood that the concepts disclosed herein can include local configurations or groups of equipment that may not be contained entirely within a building, e.g., including vehicles, such as trains, busses, airplanes, ships, automobiles, and other open spaces, such as parks, neighborhoods, etc. Without restriction, at least some indications of devices being local to each other, or proximal, or collocated, include geographical separation, e.g., within some distance limit, such as tens of feet, hundreds of feet, or morre. Other indications can include within line of sight, sharing local facilities, such as buildings, electrical power, physical security, common network access points and/or edge equipment, common WiFi, and the like.

In at least some instances, a determination, including an inference, of power consumption can be determined based on one or more of a device type, a mode of communication and/or particular details of the message traffic. A power consumption of a battery operated device may depend on specified battery life, measured past performance, a battery charge status, e.g., time since last charge, a battery historical charge status, e.g., how many charge cycles, and the like. Devices that communicate using wireless protocol may consume power at different rates depending upon the particular wireless protocol, e.g., Bluetooth versus WiFi, versus 3GPP LTE. Likewise, messages transmitted from such mobile devices may tend to consume power at a greater rate than messages received.

Alternatively or in addition, power consumption can be determined based on an application. For example, a mobile device streaming video may consume more or less power than a mobile device engaged in a VoIP call. In at least some embodiments, power consumption due to applications can be inferred from a type of message traffic, a type of device, device and/or data session authorizations, and the like.

Beneficially, the power management subsystem 226 can be configured to monitor operation of one or more of the connected devices of an ecosystem and/or operation of one or more subscribed services based on power status. For example, network traffic, sometimes referred to as device "chatter" can be rationed or otherwise reduced if device power falls below certain threshold level. Such action would tend to conserve energy. In case of power outage, e.g., including battery depletion. A notification can be provided to a user and/or operator. In some embodiments, the support management system 210 can send a notification to a local power company and/or any other related service provider entity about the power outage. Such notifications can be accomplished alone or in combination with reducing the consumption to a lower level, e.g., a minimum.

In some embodiments, the power management subsystem 226 includes an independent power source, such as a battery backup, power generator, and the like. The backup power source can provide prime power to the support management system 210, e.g., to preserve an operational capability for at least a predetermined period of time. For example, an uninterruptable power source can provide electrical power that may be limited in quantity and/or duration to allow the support management system 210 to save system states, data, to coordinate back up provisions, failover and/or shut down of one or more connected devices/sensors of supported ecosystems 202. Alternatively or in addition, the power backup resources of the power management subsystem 226 can be shared with one or more of the devices/sensors to coordinate back up provisions, failover and/or shut down of one or more connected devices/sensors of supported ecosystems 202. For example, power can be shared with one or more devices/sensors having a wired, e.g., LAN, connection to the support management system 210. Examples include, without limitation, Power over Ethernet (PoE).

The network protocol converter subsystem 228 can communicate with a network service provider, e.g., a carrier network. For example, the network protocol converter subsystem 228, by way of communications with a provider and/or provider network, can identify available carrier services, status of available service(s), applicable protocols, upgrades and the like. In at least some embodiments, the network protocol converter subsystem 228 can communicate directly with other modules and/or services. Examples include, without limitations, smart profile IMS services, and/or other 3$^{rd}$ party applications. Auto Failover/Redundant/Backup connection to the cloud.

The storage subsystem 220 can be used to store any information that may be required implementing operation and/or operational goals of the support management system 210. For example, the storage subsystem 220 can provide backup and redundant local storage proximate to the devices and/or sensors of the supported ecosystems 202. Stored information can include one or more of any signaling traffic and/or user data. The stored information can include one or more of outbound messages, e.g., originating from devices/sensors of a local premises, and/or inbound messages originating elsewhere and directed to devices/sensors of the local premises.

The storage subsystem 220 can store information during interruptions, e.g., device failures, power failures, network failures, network interruptions, traffic congestion and the like. Alternatively or in addition, the storage subsystem 220 can routinely save data gathered from the devices/sensors during normal operations in case of device controlled shut down. For example, the storage subsystem 220 can store all data in an archive, or a portion of the data in a buffered arrangement. Operation of the buffer can be based on one or more of available storage, a priority value, a service level agreement (SLA), and the like. Stored information can be retained according to an available buffer depth, e.g., storage capacity, and/or a period of time, e.g., the past 10 minutes of data, the past 1 hour of data, the past several hours of data, days of data, and the like.

Such storage arrangement can depend upon applied policies or rules. For example, storage capacity can be portioned out to supported devices/sensors of supported ecosystems 202. Alternatively or in addition, storage capacity can be portioned out according to user identity, a priority, a network provider, a type of network, e.g., a mobile broadband network versus a cable network, subscribed services, active services, and the like. Alternatively or in addition, the storage arrangement can depend at least in part on past historical performance Historical performance can include number and length of past power outages, time, number and duration of past access to network services and/or subscribe services, and the like. For example, some devices/sensors, services and/or networks presently in use or more likely to be used may be backed up differently from other devices/sensors, services and/or networks not presently in use or less likely to be used.

It is understood that any of the policies and/or rules disclosed herein can be adapted. Adaptation can be based on one or more of past performance, planned performance, changes in status of any of the devices, users, subscriptions, priorities, and the like. In at least some embodiments, a machine learning can be applied to adaptation and/or management of such policies and/or rules. For example, past network performance, past application usage, past power status and the like can be monitored. Alternatively or in addition, past performance can be monitored for the support management system 210, which can include past performance of one or more of the individual subsystems 220, 222, 224, 226, 228. To the extent past performance was successful and/or unsuccessful, machine learning can be applied to alter any rules and/or policies. A goal would be to improve performance of the devices/sensors of supported ecosystems and/or performance of the support management system 210, based on past performance.

In at least some embodiments, the support management system 210 provides an alternative means of communication, e.g., by the independent network connection 216 and/or by a dedicated, always-active open channel or tunnel. This independent means of communication can be used as a primary means of network access, as a redundant means of network access and/or as a backup means of network access, used to facilitate failovers, backups, and/or general redundancies of operation of the connected devices and/or network access.

Figure 3:
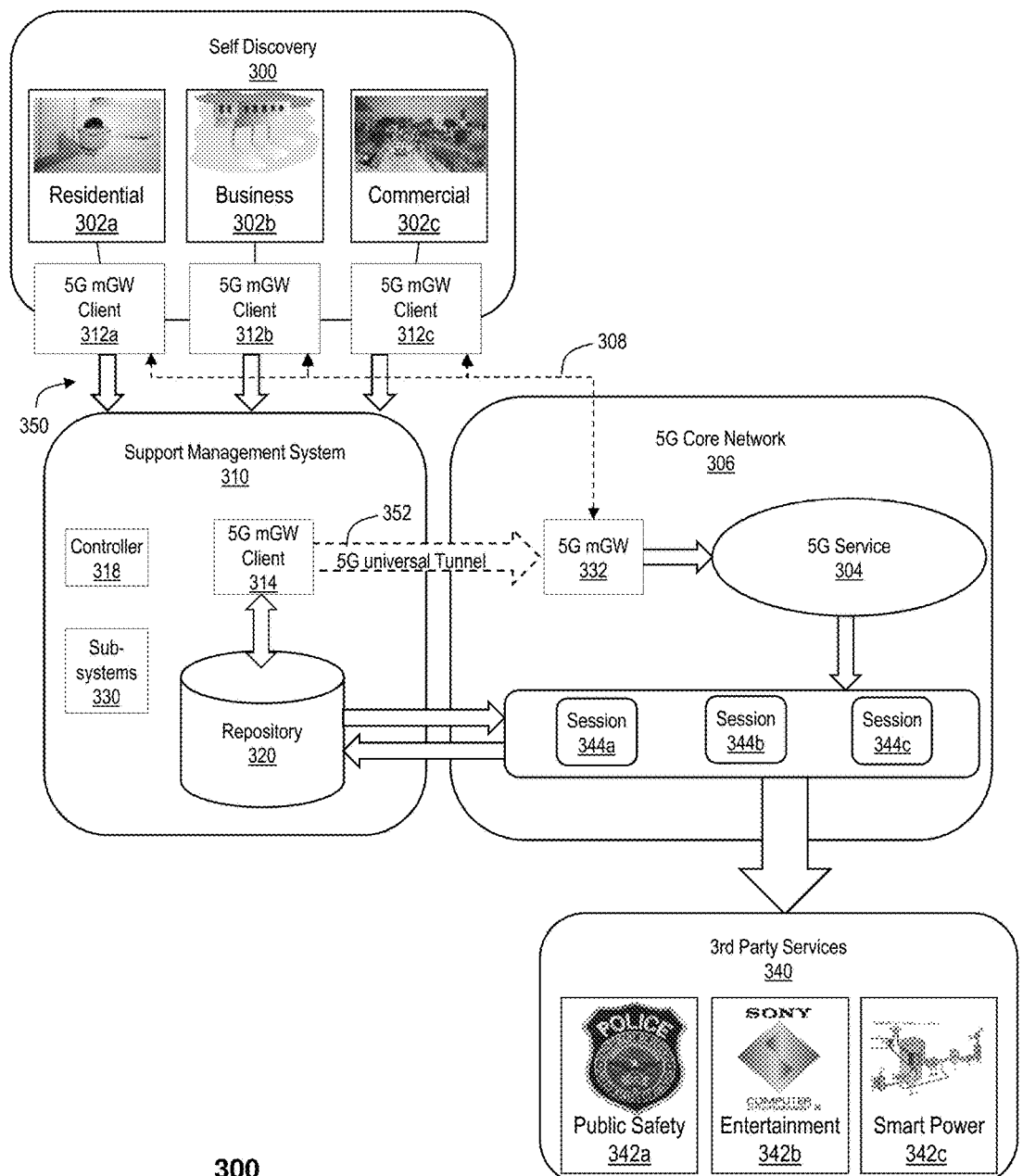
FIG. 3 depicts an illustrative embodiment of a local connected device support system.

FIG. 3 depicts an illustrative embodiment of an electronic services ecosystem 300 including a connected device support management system 310. In at least some embodiments, the operation and/or features of the support management system 310 are similar to those described in association with the aforementioned support system 210 (FIG. 2). In more detail, the support management system 310 includes a controller 318, one or more subsystems 330, such as the aforementioned individual subsystems 220, 222, 224, 226, 228 (FIG. 2), including s repository 320. The repository 320 is adapted to store information during interruptions, e.g., device failures, power failures, network failures, network interruptions, traffic congestion and the like. The support management system 310 also include a network module, in this instance, a 5G management gateway client 314, to facilitate network access to one or more of connected devices of supported ecosystems 302a, 302b, 302c (generally 302), a core network 306, digital services 304 and/or equipment of third parties 340.

In the illustrative example, the device support management system 310 is in communication with the connected devices/sensors of supported ecosystems 302 by way of 5G management gateways 312a, 312b, 312c (generally 312). Likewise, the device support management system 310 is in communication with the 5G core network 306 by way of a 5G management gateway client 314 associated with the device support management system 310, and a 5G management gateway 332 of the 5G core network 306. In at least some embodiments, the devices/sensors of the supported ecosystems 302 are in communication with the 5G core network by way of independent network connectivity 308.

The 5G core network includes subscribed services 304 that can include service provider services, e.g., VoIP, entertainment, network storage, and the like, alone or in combination with other third party services 340, e.g., public safety 342a, entertainment 342b, and smart power 342c (generally 342). Also illustrated in association with the core network 306 are a public safety session 344a, an entertainment session 344b, and a smart power session 344c (generally 344). The sessions 344 can include sessions instantiated during normal operations of the connected devices/sensor, the core network 306 and the services 342. For example, the sessions may require one or more of access restrictions, such as authorization, data usage, billing, and so on. The support management system 310 can facilitate operations during an interruption experience with one or more of the connected devices/sensor, the core network 306 and the services 342. Such support features can be based on an initial discovery of the connected devices/sensors, activation of a control and/or data channels 350 between the support management system 310 and the devices/sensors of the supported ecosystems 302, and application of policies and/or rules.

In the illustrative example, a communication channel 352 is established between the 5G management gateway client 314 of the support management system 310, and the 5G management gateway 332 of the core network 306. The communication channel 352 can facilitate an exchange of signaling and/or user data. In at least some embodiments, the communication channel 352 is always connected, despite status and/or activity of any of the devices/sensors of the supported ecosystems 302. It is understood that the always active channel, e.g., a 5G tunnel, can be used by one or more of the connected devices/sensors for routine network activity. For example, devices and/or sensors, such as those used in machine-to-machine type communications, e.g., Internet of Thigs (IoT), may have a limited power capacity. In order to reduce networking load on such devices, message can be sent using the always-active channel 352, without requiring attachment of the devices, activation of a communication channel, and so on.

In at least some embodiments, the communication channel 352 can support network activity that would otherwise use a primary network connection 308. Accordingly, the communication channel 352 serves as a backup channel, e.g., in the event of an interruption to one or more of the primary network connection 308, the devices/sensors of any supported ecosystems 302, the third party services 340, etc. Policies and/or rules imposed by the support management system 310 can implement a failover operation to preserve access to services, to prevent loss of data, and the like. It is understood that the support management system 310 can establish independent sessions and/or access existing sessions 344 in the event of any failover scenarios.

By way of illustrative example, referring again to FIG. 1, the connected devices of a supported ecosystem include biometric monitors, such as a blood oximeter 166a, a pulse-rate monitor 106b and/or a fitness monitor 106c. The local ecosystem includes an association of the particular connected devices with a user or group 104 (FIG. 1). It is understood that in at least some embodiments, the connected devices operate autonomously or in combination to monitor biometric information of the user or group 104. Such normal operations, sometimes referred to as autopilot mode. Under normal operation, the devices are configured to monitor one or more biometric values. The monitored value(s) can be compare to a range or threshold to identify a condition, such as an abnormal condition. Comparisons of the monitored values to the ranges or thresholds can be performed by the connected devices 106, by a local ecosystem client 108, by an ecosystem server 109, or by some other application and/or process, such as an optional connected device manager 119 (shown in phantom). In at least some embodiments, the comparisons and/or monitoring can be accomplished by a subsystem of the support management system 210 (FIG. 2) Identification of ranges and/or thresholds can be accomplished on a user interface of the connected devices 106, of the device manager 119, and/or via an application that facilitates management of settings of the individual connected devices 106.

In at least some embodiments, monitored values can be processed, e.g., according to statistics, and/or conversions and the like. It is understood that in at least some instances, processing can include combinations of monitored values from the same or different ones of the connected devices 106. The values and/or processed results can be stored in a data log, e.g., on the connected devices 106, the device manager 119, and/or in cooperation with a controlling application of the connected device 106 or collection of connected devices 106.

In at least some embodiments, operation of one or more of the connected devices is based on monitored values and/or resulting processed values. For example, administration of a medicine, adjustment of a temperature, a humidity, an ambient oxygen level and the like, can be controlled based on the measured and/or processed values according to a pre-programmed logic. Namely, normal operations can include sophisticated manipulation of monitored values and/or adjustment of operation of the connected devices 106 based on the preprogrammed logic. Accordingly, such normal or routine operations can proceed without intervention of the ecosystem client 102. Beneficially, the ecosystem client 102 can transition to a relatively dormant or low-power state to realize an efficiency with respect to one or more of power, processing capacity, bandwidth, memory, storage, and the like.

Upon detection of an abnormal condition, a message, signal or other suitable notification is provided to the local ecosystem client 108, the ecosystem server 109, or both. For situations in which the local ecosystem client 108 and/or server 109 are in a relatively dormant or low-power state, the notification causes the local ecosystem client 108 and/or server 109 to wake up or otherwise transition to a normal operating mode, as distinguished from the dormant mode. For scenarios in which a subsystem of the support management system 210 (FIG. 2) is monitoring operation of the devices and applying rules, a detection of an abnormal condition, a message, signal or other suitable notification is provided by the support management system 210, e.g., by way of the always active channel 252 to the sessions 344 supported by the core network 306 and/or to the third party services 340 (FIG. 3).

In response to the notification and while in the active mode, the local ecosystem client 108 and/or server 109 (or subsystem of the support management system 210) determines a rule and/or policy to be applied based on the notification. In at least some embodiments, the rule and/or policy is determined according to a look-up procedure in the repository 110. Accordingly, the repository 110 can be pre-configured with one or more rules and/or policies. The rules and/or policies can be associated with the user or group 104, e.g., according to a predetermined preference and/or restriction. Such preferences and/or restrictions can be established or otherwise modified by the user or user group 104 and/or by a third party, such as a doctor, or medical clinician, or more generally, according to a related service provider.

It is understood that the rules and/or policies based on the preferences and/or restrictions can be further based on the nature of the notification. For example, different notifications can be provided according to the different connected devices 106 can be based on which device experienced a monitored value exceeding a predetermined range or threshold. Alternatively or in addition, different notifications can be provided for the same connected device, depending upon which value of multiple monitored values exceeds the range or threshold. In at least some embodiments, different notifications can be provided for the same connected device 106 and according to the same monitored value, depending upon the particular range and/or threshold exceeded.

Consider an example in which a patient's blood glucose is monitored. While the blood glucose remains in a normal range, the local ecosystem 102 and/or ecosystem server 109 can remain in a dormant or autopilot operational mode. In response to the blood glucose exceeding a first level, a patient can be notified, e.g., by text, audio and/or video message to take proactive measures to counteract the monitored change in glucose level. Such measures may include one or more of administration of a medicine, such as insulin, or consumption of a sugary drink or snack.

Continuing with this example, the blood glucose monitor provides a first notification that the blood glucose level has exceeded a normal range, but not exceeded an emergency limit. The notification is provided to the local ecosystem client 108, e.g., resident on a user's mobile phone, tablet device, set-top box, residential gateway, or the like. To the extent that the local ecosystem 108 was in a dormant mode, operation transitions to an active mode. The local ecosystem 108 observers that the notification was received from the blood glucose meter in association with a particular user 104. The local ecosystem 108 queries the repository 110 for the particular user 104 to identify a predetermined response to an moderately and not critically elevated blood glucose level.

The predetermined response can include providing a message to the user 104, as indicated above. To facilitate messaging the user 104, the local ecosystem client 108 instantiates one or more of a messaging service, an email, a VOD service, a VoIP service, and the like in the service layer 116. A message is provided to the user 104 via the one or more instantiated services. It is understood that further logic can monitor the user's blood glucose level, e.g., according to a more frequent schedule, until the blood glucose level returns to a normal range. Upon a return to the normal range, the instantiated services can be terminated, or otherwise rendered dormant. Likewise, the local ecosystem client 108 can return to a dormant or autopilot mode.

It is understood that in the illustrative example, it is possible that the user's blood glucose level may exceed a critical range or threshold. Accordingly, comparison of monitored blood glucose levels to the predetermined ranges or thresholds provides a notification. The notification can be the same as in the previous scenario. Namely, the same notification can be provided regardless as to the nature of the abnormality. In order to distinguish an appropriate response, further inspection of a monitored value, such as the value that triggered the notification can be evaluated. Alternatively or in addition, a different notification can be provided based on the nature, severity or the like of the monitored value. Accordingly, such notifications can be differentiated according to a normal situation, an abnormal but not critical situation and a critical situation, e.g., according to a green, yellow red scale.

Having determined that the blood glucose level of the user has become critical, the local ecosystem client 108 queries the repository 110 to identify a course of action. In this critical scenario, the course of action can include instantiating a service by way of the public safety service 118a of the service layer 116 of the network 114. The particular service 118a can include access to a third party service network 120. For example, the healthcare service 118a, via the third party service network 120, can dispatch an ambulance 122a to a location, e.g., a residence or business 112 of the user 104. Alternatively or in addition, the healthcare service 118a, via the third party service network 120, can notify a trauma center 122c that the particular user 104 is being transported via the ambulance service 122a to the trauma center 122c. It is further understood that other services can be instantiated in coordination with one or more other services. For example, a traffic controller service 122b can coordinate traffic flow in cooperation with the dispatch of the ambulance to the user's residence/office 112 and/or transport of the user 104 to the trauma center 122c.

Figure 4:
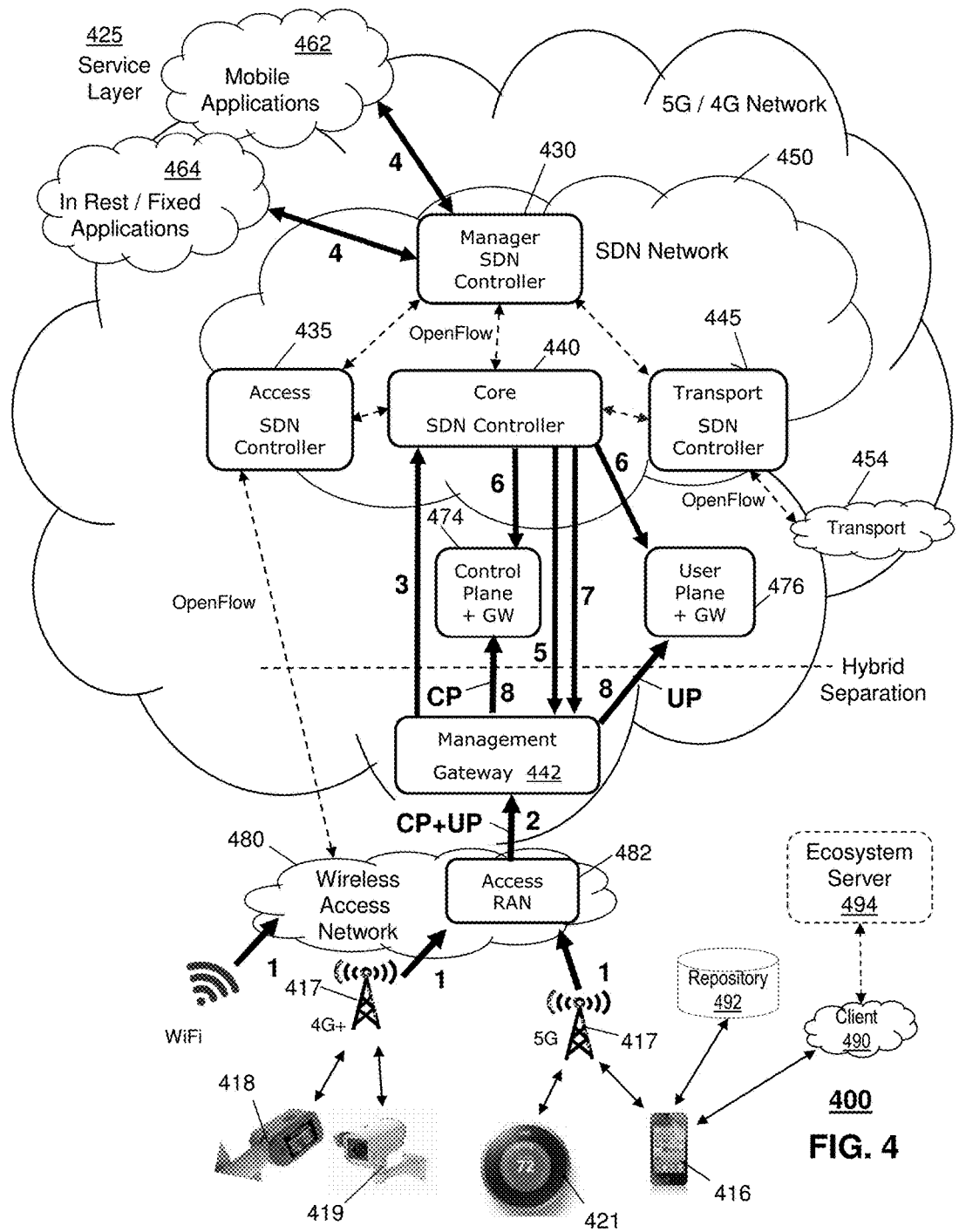
FIG. 4 depicts an illustrative embodiment of a software defined network (SDN) communication network that supports services to network-accessible devices.

FIG. 4 depicts an illustrative embodiment of a communication system 400 that includes software defined network (SDN) elements featuring intelligent and dynamic control of network traffic that supports services to communication devices. The SDN-based communication system 400 can provide services to communication devices, and includes a controller that instantiates Management Gateways (MGWs) at the edges of the network. The MGWs can receive network traffic from various access networks, which provide local access points for the communication devices. After receiving network traffic from an access network, a MGW can send information about the network traffic to the SDN Controller. The SDN Controller can determine required service functions from this information and, in turn, can use the service function information to determine how the network traffic should be routed to one or more Core Gateways (CGWs) in the network. The SDN Controller can communicate with a selected CGW to enable Virtual Network Functions (VNF) at the CGW and can direct the receiving MGW to route the network traffic to this CGW. The SDN-based network can use the edge-located MGW to route network traffic from Fourth Generation (4G) and Fifth Generation (5G) access networks to different CGWs. The SDN-based network can also selectively separate Control Plane and User Plane processing to improve network performance. The SDN Controller can also monitor instantiated VNF elements at the MGWs and CGWs for network resources levels and modify these VNF elements, as needed, to insure optimal performance.

At least portions of the example communication network 400 can be controlled by one or more SDN Controllers. For example, a SDN network 450 can include a Manager SDN Controller 430, an Access SDN Controller 435, a Core SDN Controller 440, and/or a Transport SDN Controller 445. The functions of the different types of SDN Controllers 430-445 are further described below. Each SDN Controller, such as, for example and ease of illustration, the Manager SDN Controller 430, can be provided by a computing system executing computer-executable instructions and/or modules to provide various functions. In one or more embodiments, multiple computer systems or processors can provide the functionality illustrated and described herein with respect to each SDN Controller 430.

In one or more embodiments, the communication system 400 can include a Service Layer 425. The Service Layer 425 can provide access to services of a network service provider and/or third-party services and applications at a higher application layer. The Service Layer 425 can include capability servers, owned by the operator of the communication system 400, that can access and provide access to application layer servers owned by third-party content providers via open and secure Application Programming Interfaces (APIs). The Service Layer 425 can also provide an interface to a Core Network. The communication system 400 can also include access to Applications, such as Fixed/In Rest Applications 464 and/or Mobile Applications 462.

In one or more embodiments, the communication system 400 can include an SDN Network 450. The SDN Network 450 can include one or more SDN Controllers 430, 435, 440 and 445 that can provide different types of functions and can be arranged in virtual layers. For example, the SDN Network 450 can include a Manager SDN Controller 430 that controls and coordinates functioning of the SDN Network 450. The Manager SDN Controller 430 can be a top-level Management System in the architecture. Below the Manager SDN Controller 430, a next level of SDN Controllers 435, 440 and 445 can be instantiated and configured by the Manager SDN Controller 430 to provide specific classes of functionality in the architecture. For example, the Manager SDN Controller 430 can provide level 3 functionality to control and coordinate service control, configuration, and data flow in the communication system 400. The Manager SDN Controller 430 can, as needed, instantiate, configure, and direct level 2 SDN Controllers 435, 440 and 445 for controlling Access, Core, and Transport capabilities in the communication system 400.

In one or more embodiments, the SDN Network 450 can allow the communication system 400 to separate control plane operations from a data plane operations and can enable layer abstraction for separating service and network functions or elements from physical network functions or elements. In one or more embodiments, the Manager SDN Controller 430 can coordinated networking and provision of applications and/or services. The Manager SDN Controller 430 can manage transport functions for various layers within the communication network and access to application functions for layers above the communication network. The Manager SDN Controller 430 can provide a platform for network services, network control of service instantiation and management, as well as a programmable environment for resource and traffic management. The Manager SDN Controller 430 also can permit a combination of real time data from the service and network elements with real-time or near real-time control of a forwarding plane. In various embodiments, the Manager SDN Controller 430 can enable flow set up in real-time, network programmability, extensibility, standard interfaces, and/or multi-vendor support. In one embodiment, interactions between layers of the communication system 400 can be based upon policies to determine optimum configuration and rapid adaptation of the system 400 to changing state and changing customer requirements for example, predicted demand, addition of new users, spikes in traffic, planned and unplanned network outages, adding new services, and/or maintenance.

In at least some embodiments, the communication system 400 can be configured to receive 4G+ and 5G traffic. The Wireless Access Network 480 receives network traffic from the connected devices 416-421 that are connected to both 4G+ systems and 5G systems. To handle both 4G+ and 5G communications, the Access RAN 482 forwards network traffic to the MGW element 442 as combined Control Plane and User Plane traffic in data flow 2. However, when the Core SDN Controller 440 evaluates the network traffic associated with the communication devices 416-421, it can determine, based on the service that is requested, the that network traffic can be processed according to separate paths for the Control Plane traffic and the User Plane Traffic. The Core SDN Controller 440 can control the routing of the network traffic according to data flows 5 and 7, such that the network traffic flows separately to the Control Plane GW 474 and the User Plane GW 476 in data flows 8.

The SDN-based communication system 400 can provide features that support a user-centric ecosystem. For example, the connected devices 416-421 can include any of the various devices and/or systems disclosed herein, including those that can participate in any of the various ecosystem configurations also disclosed herein. For example, one of the connected devices, such as the mobile phone 416 can include an ecosystem client 490 that can facilitate, implement and/or otherwise orchestrate features of the user-centric ecosystem. For example, the mobile phone 416 and/or the ecosystem client 490 can access a repository 492 to determine a rule and/or policy to be applied to operation of the user-centric ecosystem. Application of the rule and/or policy can be based on or otherwise responsive to operation of one or more of the connected devices 416-421. Techniques related to dynamic network routing in a software defined network are disclosed in U.S. patent application Ser. No. 15/351,618, entitled "Method and Apparatus for Dynamic Network Routing in a Software Defined Network," filed on Nov. 15, 2016, and incorporated herein by reference in its entirety.

Figure 5:
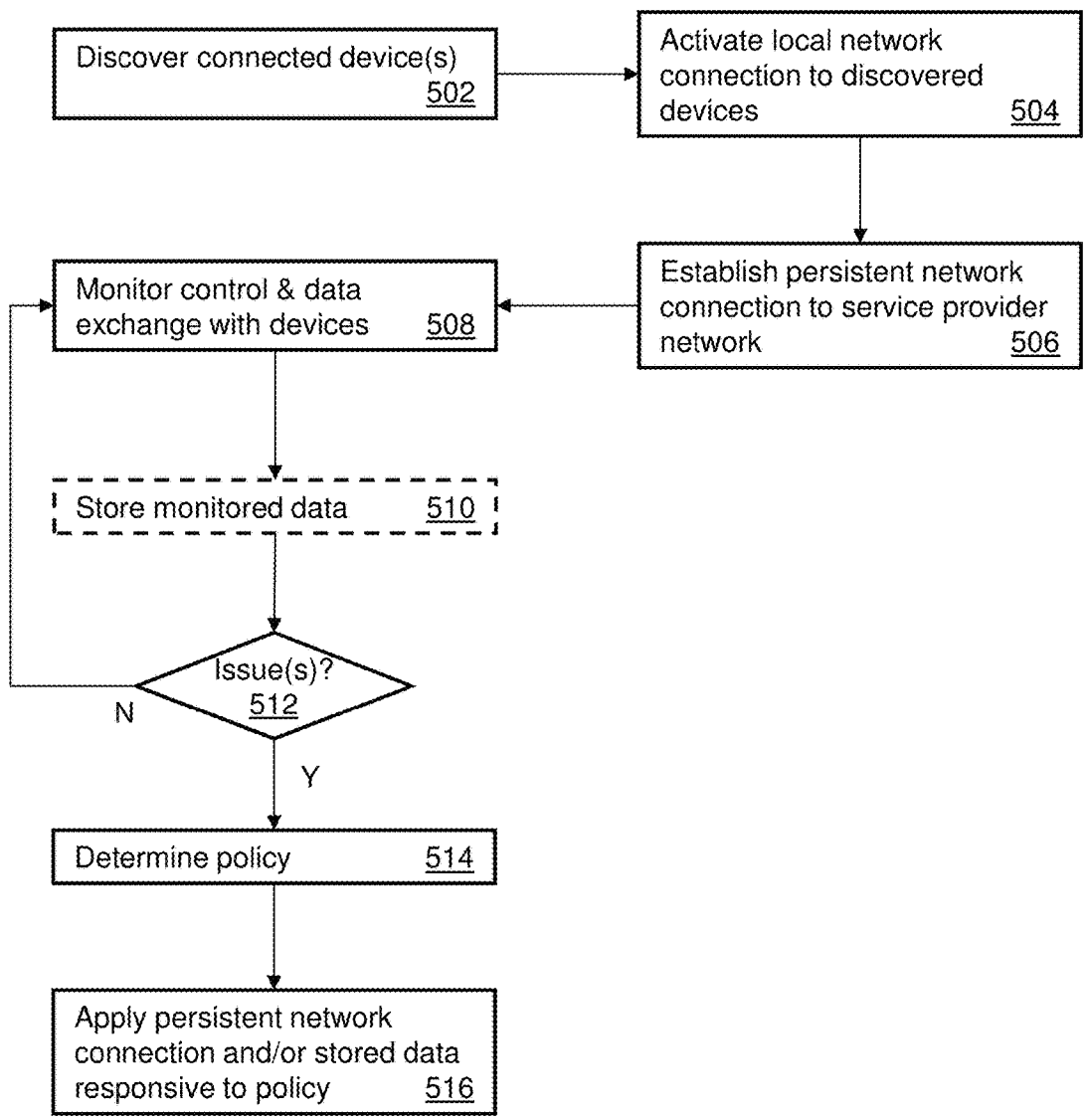
FIG. 5 depicts an illustrative embodiment of a process used in portions of the systems described in FIGS. 1-4.

FIG. 5 depicts an illustrative embodiment of a process 500 used in portions of the systems described in FIGS. 1-4. The process includes discovering connected devices and/or sensors of a supported ecosystem at 502. The connected devices can include any network-enabled device, including the example devices disclosed herein, and equivalents thereto. Examples include communication devices, such as smart phones, sensors, such as home alarm sensors, biomedical sensors, and the like.

In some embodiments, discovery of the devices is determined according to a definition. Such definitions can be provided by users, network operators, third party service providers, and the like. Alternatively or in addition, the devices can be determined automatically, e.g., based on a monitoring of network activity. The network activity can include control signaling and/or user data originating at the devices and/or sensors of the supported ecosystem. Alternatively or in addition, the network activity can include control signaling and/or user data originating from the service provider network side, e.g., from a core network portion of the service provider network, from applications associated with subscribed services, and/or from third party service providers.

A local network connection providing network connectivity to the discovered devices and/or sensors is activated at 504. This activation can include a local network connection. For the 5G examples disclosed herein, activation can be accomplished by coordination between a 5G media gateway 214, 314 client of a support management system and 5G media gateway(s) 212, 312 of devices/sensors of supported ecosystems. Alternatively or in addition, network connectivity can be provided by any other suitable means, e.g., including an alternative wireless network connection, e.g., Bluetooth personal area network, WiFi and/or a wired connection, e.g., a LAN connection and/or a proprietary connection.

A persistent network connection to a service provider network is established at 506. In at least some embodiments, the persistent network connection includes a tunneling protocol. For the 5G examples disclosed herein, the persistent connection can include a 5G universal tunnel. Such universal tunnels can be configured to allow for an exchange of data and/or control signaling from one or more of the support management system 210, 310 and the locally supported ecosystems 202, 302, including the management gateways 212, 214, 312, 314.

The persistent network connection, e.g., the 5G universal tunnel 252, 352, once established, remains operational without regard to connected device/sensor activity. Such a persistent channel can be used by low power devices to facilitate an exchange of data with digital services and/or a service provider core network 206, 306. Beneficially, the persistent nature of the channel ensures that it remains available for use by the devices, without requiring that the devices engage in any control messages and/or signaling that would otherwise be required to establish a channel.

Network activity in the form of control and/or signaling and/or user data related to the discovered devices are monitored at 508. This can include some or all of control message traffic, e.g., according to a control plane and/or some or all of user data traffic, e.g., according to a user plane. In at least some embodiments all or part of the monitored data can be stored at 510. In some embodiments, monitored network activity is stored without regard to content. For example, data of a particular subscribed service session can be maintained for a duration of the session, or for some other predetermined period of time. Alternatively or in addition, the data can be stored in a buffer, in which new data overwrites previously stored data allowing a predetermined quantity of data to be retained at any given time.

A determination is made at 512, whether there are any issues requiring application of a policy. To the extent that no issues are identified, the process continues monitoring a control and/or user data exchange with one or more of the discovered devices at 508.

To the extent that issues are determined at 512, a policy is identified at 514. A policy can include any conceivable policy related to one or more of the connected devices of supported ecosystems, subscribed services, service provider networks, personal preferences, business policies, governmental policies, and the like, including any of the example policies disclosed herein.

The persistent network connection and/or the stored data are applied responsive to the policy at 516. Policies can include, without restriction, failover policies that disclose one or more rules to be implemented in support of an issue requiring failover, e.g., a power outage, a network interruption, device failure, and so forth. Stored data can include, without limitation, one or more of subscriber and/or device identification, user/device authentication information, equipment identifications, equipment capabilities, user preferences, subscription levels, account balances, data usage.

In at least some embodiments, the stored data includes data obtained from the devices, the service provider network and/or from the digital service providers. This information can include device values, e.g., sensory values identified by the devices, such as biometric values, environmental values, and the like. In the event of a failure of one or more of the devices, the network and/or the equipment of the service provider, the data can be stored and/or applied. For example, data from the local devices can continue to be stored in the event of a momentary interruption to a network connection, e.g., due to interference or congestion. The stored data can be transported through the network according to an alternative backup connection, e.g., the 5G universal tunnel 352.

Figure 6:
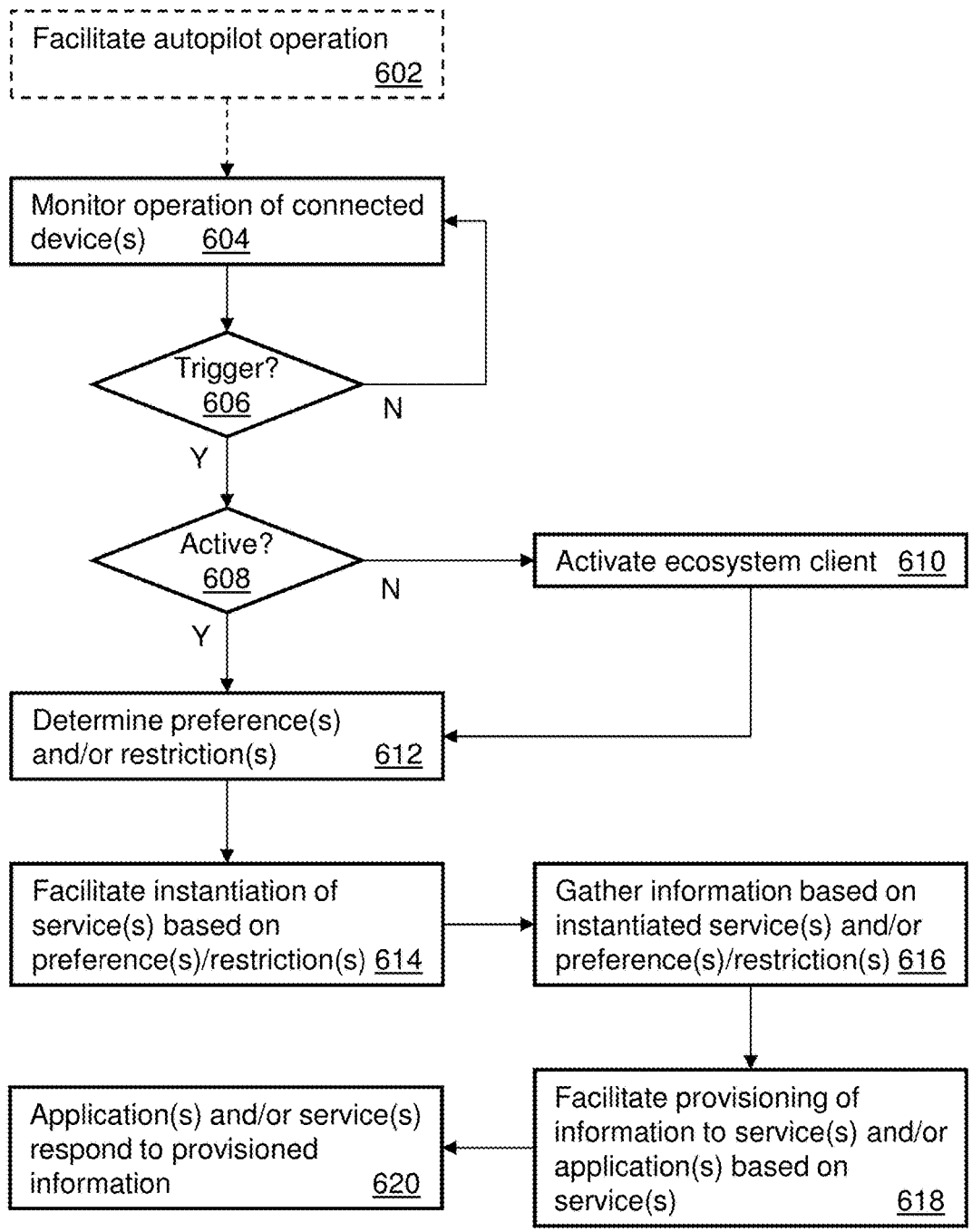
FIG. 6 depicts an illustrative embodiment of a process used in portions of the systems described in FIGS. 1-4.

FIG. 6 depicts an illustrative embodiment of a process 600 used in portions of the systems described in FIGS. 1-4. More particularly, the process 600 facilitates operation of a user-centric ecosystem that enables a real-time coordination of operation of one or more connected devices and/or services in association with a user and/or group of users. In at least some embodiments, the process 630 includes facilitating a normal operational mode, sometimes referred to as an autopilot mode, at 602. The normal mode operation can include operation of one or more connected devices 106 (FIG. 1). Accordingly, the devices can be identified, activated and/or otherwise instructed or caused to operate.

Normal operation of the connected devices 106 can include monitoring of the connected devices at 604. Monitoring can include observing, detecting and/or measuring a value in relation to operation of the devices 106. The value can be an environmental value, such as movement within a field of view of a camera, facial recognition, detection of audible noises, such as speech and non-speech vocalizations and/or background noise, music and the like. Alternatively or in addition the monitoring can include monitoring of biometric parameters of a user or group of users. Still other monitoring scenarios include monitoring operation of a device, such as an appliance, a machine, e.g., a vehicle.

The monitored values can be compared to a predetermined range, threshold and/or value. Such comparisons can distinguish between a normal and/or expected situation and an abnormal situation. A trigger can be identified at 606, e.g., responsive to the comparison of the monitored value with the predetermined range, threshold and/or value. In some embodiments, the trigger can identify onset of an abnormal condition, e.g., when the monitored value exceeds the range or threshold. Alternatively or in addition, the trigger can identify a return to a normal condition, e.g., when the monitored value, after having exceed the range or threshold, subsequently returns to the acceptable range or below the identified threshold.

In response to a monitored value not resulting in a trigger at 606, the process 600 returns to once again monitor one or more of the connected devices at 604. It is understood that the monitoring of more than one of the connected devices can be accomplished sequentially or in parallel. Namely, in some embodiments, each connected device can be monitored according to a monitoring schedule. For example, each device monitored, in turn, separated by a sample or monitoring delay value. When the last device has been monitored, the monitoring can return to a first device and continue in a like fashion. In some embodiments, certain connected devices may require more frequent monitoring, while others may not. In such instances, a monitoring cycle can be determined according to respective monitoring cycle times, and the monitoring conducted in a sequential and/or parallel manner according to the respective cycle times.

In response to a monitored value resulting in a trigger at 606, a subsequent determination as to whether an ecosystem client 108 (FIG. 1) is active can be accomplished at 608. To the extent that the ecosystem client 108 is inactive, the ecosystem client is activated at 610. Activation of the ecosystem client 108 can include waking the application from a dormant, relative low activity, or even inactive mode of operation. Such activation of the ecosystem client 108 can include any suitable means, such as providing an alert, a notification, a signal and/or instruction to the ecosystem client 108. Once activated, the process 600 continues to 612.

To the extent that the ecosystem client 108 is active at 608, the process also continues to 612 at which a determination is made as to one or more preferences and/or restrictions. In some embodiments, the preferences and/or restrictions can be determined automatically, e.g., according to a look-up process in conjunction with a repository 110 (FIG. 1). The lookup process can be based on one or more of an identity of a user or group of users of the user-centric ecosystem 108. Alternatively or in addition, the look-up process can be based on the monitored value(s), the nature of the activation at 610, and so on.

Having determined or otherwise identified the preference and/or restrictions, instantiation of one or more services is facilitated at 614. In at least some embodiments, instantiation of the services can be based on one or more of the preference(s) and/or the restriction(s), the user and/or group of users, the monitored value(s), and/or the trigger. For example, the ecosystem client 108, in response to a determination of a preference that an ambulance should be ordered in response to a critical abnormal condition, instantiates a healthcare service 118a in the service layer 116 (FIG. 1). In at least some embodiments, the ecosystem client 108 initiates an application that can operate alone or in combination with the instantiated service. In the illustrative example, the ecosystem client 108 can open a healthcare application on user device at the user location 112, e.g., a mobile phone of the user.

Information can be gathered based on instantiated service (s) and/or preference(s)/restriction(s), and/or applications at 616. For example, the healthcare application and/or the healthcare service 618a can operate to monitor the same or different biometric values using one or more of the connected devices. The process 600 continues to facilitate provisioning of information to service(s) and/or application (s) based on the service(s) at 618. For example, the application and/or healthcare service 618a can provide guidance and/or instruction for an emergency situation and/or provide further details, such as monitored values, a user location and the like to the healthcare service 118a. The application(s) and/or service(s) can respond to provisioned information at 620.

Figure 7:
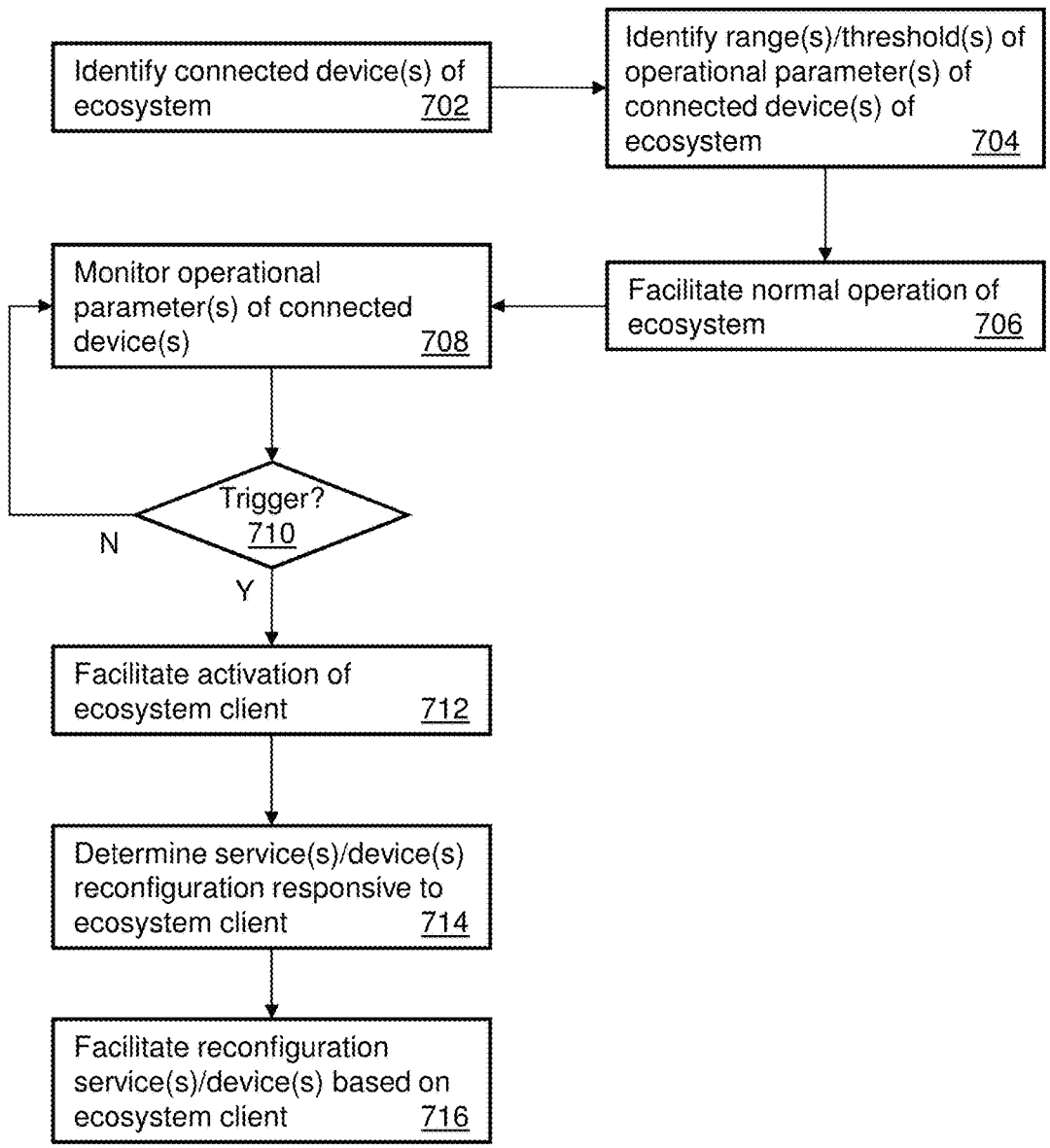
FIG. 7 depicts an illustrative embodiment of another process used in portions of the systems described in FIGS. 1-4.

FIG. 7 depicts an illustrative embodiment of another process 700 used in portions of the systems described in FIGS. 1-4. More particularly, the process 700 facilitates operation of a user-centric ecosystem that enables a real-time, adaptive coordination of operation of one or more connected devices and/or services in association with a user and/or group of users. According to the process 700, one or more connected device(s) of ecosystem are identified at 702. The user-centric ecosystem can be determined according to the identified connected devices alone or in combination with one or more services. Identification of the connected devices can be accomplished according to a user and/or group profile that identifies devices. Alternatively or in addition, the identification of the connected devices can be based on an operational state of the connected devices, e.g., devices in a powered on, active or dormant state can be identified as members of the ecosystem; whereas, devices that are powered off or otherwise disconnected or inoperative can be excluded from the ecosystem.

Range(s), threshold(s) and/or comparative value(s) of operational parameter(s) of connected device(s) of ecosystem are identified at 704. Identification of one or more of the range(s), the threshold(s) and/or the comparative values can be accomplished according to the user and/or group profile that identifies devices. Alternatively or in addition, the ranges, thresholds, and/or values can be preprogrammed into one or more of the connected devices 106 and/or a device manager 119 (FIG. 1), when provided.

Normal operation of the ecosystem is facilitated at 706. Normal operation can be predetermined, e.g., according to pre-programmed instructions, scripts, and the like. Alternatively or in addition, normal operation of the ecosystem can be facilitated by merely turning on the connected devices 106 and/or the device manager 119, when provided. Operational parameter(s) of connected device(s) are monitored at 708. The monitoring can be accomplished by the connected devices themselves, e.g., autonomously and/or according to preprogrammed instruction.

A determination is made at 710 as to whether a trigger has been detected. The trigger can result from one or more of the monitored values exceeding a predetermined range, threshold or comparative value. The trigger can include a notification and/or an alert, e.g., based on a signal provided by one or more of the connected devices 106 and/or device manager 119, when provided.

To the extent a trigger is not detected, the process continues monitoring operational parameters of connected devices at 708 and subsequently checking for triggers at 710. To the extent that a trigger is detected at 710, and to the extent that the ecosystem client is inactive, dormant, or otherwise in a relatively low-power mode, activation of the ecosystem client is facilitated at 712.

Service(s) and/or device(s) reconfiguration is determined at 714, responsive to activation of the ecosystem client. A reconfiguration of service(s) and/or device(s) is facilitated at 716, based on activation of the ecosystem client.

While for purposes of simplicity of explanation, the respective processes are shown and described as a series of blocks in FIGS. 7 and 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 8:
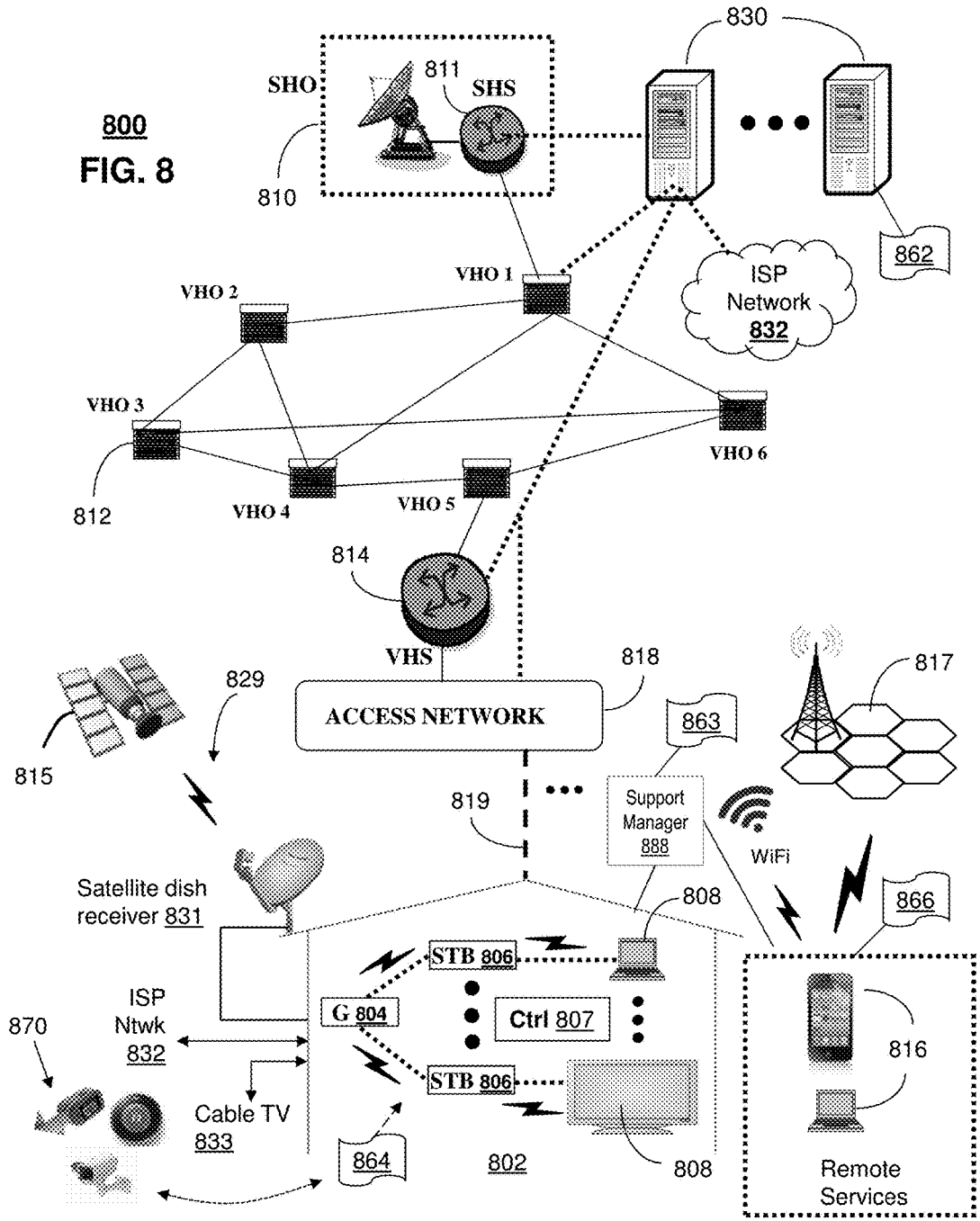
FIG. 8 depicts an illustrative embodiment of a communication system that provide media services to the ecosystems of FIGS. 1-4.

FIG. 8 depicts an illustrative embodiment of a communication system 800 that provide media services to the ecosystems of FIGS. 1-4. The communication system 800 can represent an interactive media network, such as an interactive television system (e.g., an Internet Protocol Television (IPTV) media system). Communication system 800 can be overlaid or operably coupled with the electronic services ecosystem 100 of FIG. 1, the local connected device support systems 200, 300 of FIGS. 2-3, and the SDN communication network 400 of FIG. 4 that supports services to communication devices as another representative embodiment of communication system 800. For instance, one or more devices illustrated in the communication system 800 of FIG. 8 monitors a control plane of a service provider network including messages that facilitate network access by local equipment to subscribed services. A data plane managed by the network and separate from the control plane is also monitored. The data plane facilitates an exchange of user data between the connected devices, the network and the subscribed services. Local equipment are identified based on the monitoring of the control plane, and local network connectivity is established between the processing system and the local equipment. A common communication channel is established between the processing system and the network, wherein network access to the subscribed services is based on an exchange of the user data via the common communication channel, wherein the common communication channel is maintained in an active state without regard to the exchange of user data.

In at least some embodiments, the common communication channel is maintained during periods of inactivity. Periods of inactivity can include periods during which no user data is exchanged. In some embodiments, the common communication channel can be maintained indefinitely. Alternatively or in addition, the common communication channel can be maintained for extended durations, e.g., for a period of minutes, hours, days, and so on. In some embodiments, the common communication channel can be maintained for up to some time limit, e.g., for at least some number of seconds, minutes, hours, days, etc. In at least some applications, time limits can be based on usage, e.g., being measured from a most recent user data exchange. Alternatively or in addition, the communion communication channel can be maintained according to a schedule. Schedules can include, without limitation, normal business hours, weekdays, durations based on historical usage, trends, and the like.

In one or more embodiments, the communication system 800 can include a super head-end office (SHO) 810 with at least one super headend office server (SHS) 811 which receives media content from satellite and/or terrestrial communication systems. In the present context, media content can represent, for example, audio content, moving image content such as 2D or 3D videos, video games, virtual reality content, still image content, and combinations thereof. The SHS server 811 can forward packets associated with the media content to one or more video head-end servers (VHS) 814 via a network of video head-end offices (VHO) 812 according to a multicast communication protocol. The VHS 814 can distribute multimedia broadcast content via an access network 818 to commercial and/or residential buildings 802 housing a gateway 804 (such as a residential or commercial gateway).

The access network 818 can represent a group of digital subscriber line access multiplexers (DSLAMs) located in a central office or a service area interface that provide broadband services over fiber optical links or copper twisted pairs 819 to buildings 802. The gateway 804 can use communication technology to distribute broadcast signals to media processors 806 such as Set-Top Boxes (STBs) which in turn present broadcast channels to media devices 808 such as computers or television sets managed in some instances by a media controller 807 (such as an infrared or RF remote controller).

The gateway 804, the media processors 806, and media devices 808 can utilize tethered communication technologies (such as coaxial, powerline or phone line wiring) or can operate over a wireless access protocol such as Wireless Fidelity (WiFi), Bluetooth®, Zigbee or other present or next generation local or personal area wireless network technologies. By way of these interfaces, unicast communications can also be invoked between the media processors 806 and subsystems of the IPTV media system for services such as video-on-demand (VoD), browsing an electronic programming guide (EPG), or other infrastructure services.

A satellite broadcast television system 829 can be used in the media system of FIG. 8. The satellite broadcast television system can be overlaid, operably coupled with, or replace the IPTV system as another representative embodiment of communication system 800. In this embodiment, signals transmitted by a satellite 815 that include media content can be received by a satellite dish receiver 831 coupled to the building 802. Modulated signals received by the satellite dish receiver 831 can be transferred to the media processors 806 for demodulating, decoding, encoding, and/or distributing broadcast channels to the media devices 808. The media processors 806 can be equipped with a broadband port to an Internet Service Provider (ISP) network 832 to enable interactive services such as VoD and EPG as described above.

In yet another embodiment, an analog or digital cable broadcast distribution system such as cable TV system 833 can be overlaid, operably coupled with, or replace the IPTV system and/or the satellite TV system as another representative embodiment of communication system 800. In this embodiment, the cable TV system 833 can also provide Internet, telephony, and interactive media services. System 800 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 830 and/or 888, a portion of which can operate as a web server for providing web portal services over the ISP network 832 to wireline media devices 808 or wireless communication devices 816.

Communication system 800 can also provide for all or a portion of the computing devices 830, 888 to function as a local connected device support system 830, 888. The support management system 830, 888 can use computing and communication technology to perform function 862, which can include among other things, the device support management described by the process 500, and/or the user-centric ecosystem configuration and/or control techniques described by the processes 600 and/or 700 of FIGS. 5 through 7. For instance, function 862 of the support management system 830, or the function 863 of support manager 888 can be similar to the functions described for the support management systems 210, 310, and the smart repository 492 of FIGS. 1, 2, 3 and/or 4 in accordance with the processes 500, 600 and/or 700 of FIGS. 5 through 7. The media processors 806 and wireless communication devices 816 can be provisioned with software functions 864 and 866, respectively, to utilize the services of a user-centric ecosystem, e.g., via the services of the support management systems 830, 888. For instance, functions 864 and 866 of media processors 806 and wireless communication devices 816 can be similar to the functions described for the ecosystem client 106, 202, 302, 492 and/or the connected devices 110, 202, 302, 416, and 418-421 of FIGS. 1, 2, 3 and/or 4 in accordance with the processes 500, 600, 700 of FIGS. 5, 6 and/or 7.

Multiple forms of media services can be offered to media devices over landline technologies such as those described above. Additionally, media services can be offered to media devices by way of a wireless access base station 817 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

The support management systems 830, 888 of FIG. 8, and/or the ecosystem client(s) 864, 866 can be operably coupled to communication system 800 for purposes similar to those described above. One or more of the support management systems 830, 888 of FIG. 8 can perform the functions 862, and/or the mobile device 816, set-top box 806, gateway server 804, can provide the functions 864, 866 and thereby provide user centric ecosystem services in accordance with the processes 500, 600, 700 of FIGS. 5, 6 and/or 7. In at least some embodiments, one or more of the mobile device(s) 816, the set-top box 806, the gateway server 804, the smart television 808 can be adapted with software to utilize the services of the support management systems 830, 888.

Figure 9:
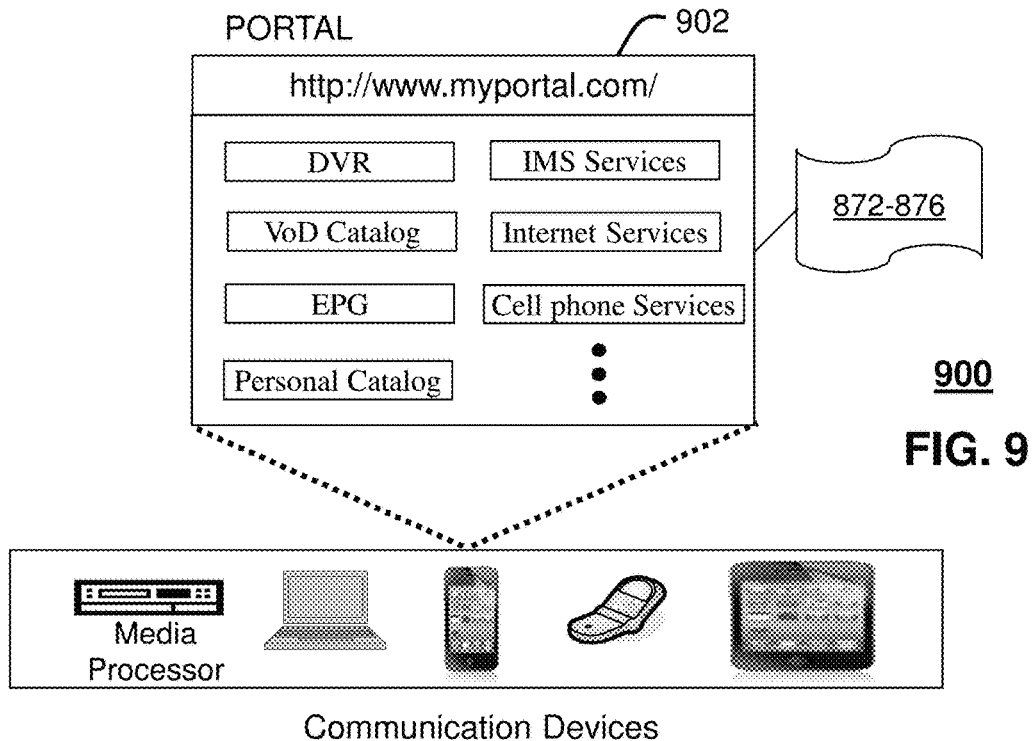
FIG. 9 depicts an illustrative embodiment of a web portal for interacting with the communication systems of ecosystems of FIGS. 1-4 and 8.

FIG. 9 depicts an illustrative embodiment of a web portal 902 of a communication system 900. Communication system 900 can be overlaid or operably coupled with systems 100, 200, 300, 400 of FIGS. 1, 2, 3 and/or 4, and/or communication system 800 of FIG. 8 as another representative embodiment of systems 100, 200, 300, 400 of FIGS. 1, 2, 3 and/or 4, and/or communication system 800 of FIG. 8. The web portal 902 can be used for managing services of systems 100, 200, 300, 400 of FIGS. 1, 2, 3 and/or 4 and/or communication system 800 of FIG. 8. A web page of the web portal 902 can be accessed by a Uniform Resource Locator (URL) with an Internet browser using an Internet-capable communication device such as those described in FIGS. 1, 2, 3, 4 and/or FIG. 8. The web portal 902 can be configured, for example, to access a media processor 806 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 806. The web portal 902 can also be used for provisioning IMS services described earlier, provisioning Internet services, provisioning cellular phone services, and so on.

The web portal 902 can further be utilized to manage and provision software applications 872-876 to adapt these applications as may be desired by subscribers and/or service providers of systems 100, 200, 300, 400 of FIGS. 1, 2, 3, 4 and/or system 800 of FIG. 8. For instance, users of services provided by a user-centric ecosystem provider can log into their on-line accounts and provision one or more of connected devices 110, 116, 218-221, 202, 302, 870 fixed and/or mobile devices 116, 202, 302, 816, 804-808, e.g., hosting an ecosystem client 106, 202, 302, 490, 864, 866 and/or an support management system 830, 888 with ecosystem management parameters. For example, the web portal 602 can be used to program and/or otherwise configure user profiles, to provide contact information to server to enable it to communication with devices described in FIGS. 1-4 and 8, and so on. Configurable parameters can include, without limitation, identification of connected devices and/or association of such devices with a user-centric ecosystem, identification of ecosystem client(s), identification of individual user(s) and/or user preferences. Other configurable parameters can include, without limitation, monitored variables, ranges, thresholds, alarm values, signal reporting rules, and the like. Alternatively or in addition, configurable parameters can include information related to services associated with the user(s) and/or the user-centric ecosystem. Services can include network service provider services and/or third party, e.g., over the top services, with adjustable parameter values including one or more of identification, for authentication authorization, auditing, security, and the like. Service providers can log onto an administrator account to provision, monitor and/or maintain the systems 100, 200, 300, 400 of FIGS. 1, 2, 3, 4 and/or the support management system 830, 888.

Figure 10:
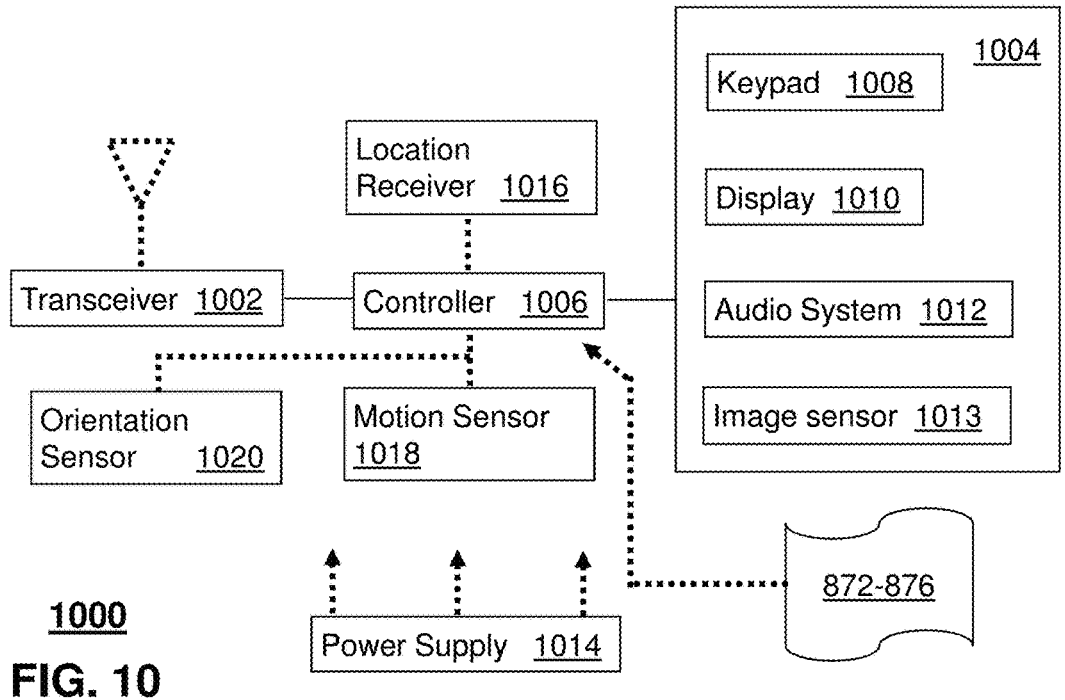
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in FIGS. 1, 2, 3, 4 and/or FIG. 8 and can be configured to perform portions of the processes 500, 600, 700 of FIGS. 5, 6 and/or 7.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of one or more of the devices of FIGS. 1, 2, 3, 4 or the media processor 806, the media devices 808, or the portable communication devices 816 of FIG. 8, as well as the IMS CDs 801-802 and PSTN CDs 803-805 of FIG. 8. It will be appreciated that the communication device 1000 can also represent other devices that can operate in systems 100, 200, 300, 400 of FIGS. 1, 2, 3, 4 and/or communication system 800 of FIG. 8 such as a gaming console and a media player. In addition, the controller 1006 can be adapted in various embodiments to perform the functions 872-876, respectively.

Upon reviewing the aforementioned embodiments, it would be evident to an artisan with ordinary skill in the art that said embodiments can be modified, reduced, or enhanced without departing from the scope of the claims described below. For example, the monitoring of the values of more than one of the connected devices can be combined. Such combinations can be applied according to a predetermined logic. Alternatively or in addition, one or more of the monitoring of the parameters, detection of the triggers, identification of the connected devices and/or determination of the preferences and/or restrictions can be determined and/or otherwise modified according to a machine learning. Such learning can be applied according to the same ecosystem and the same user or group of users over time. Alternatively or in addition, the machine learning for one ecosystem and/or user/group can be applied according to observations of another ecosystem and/or other user or group. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
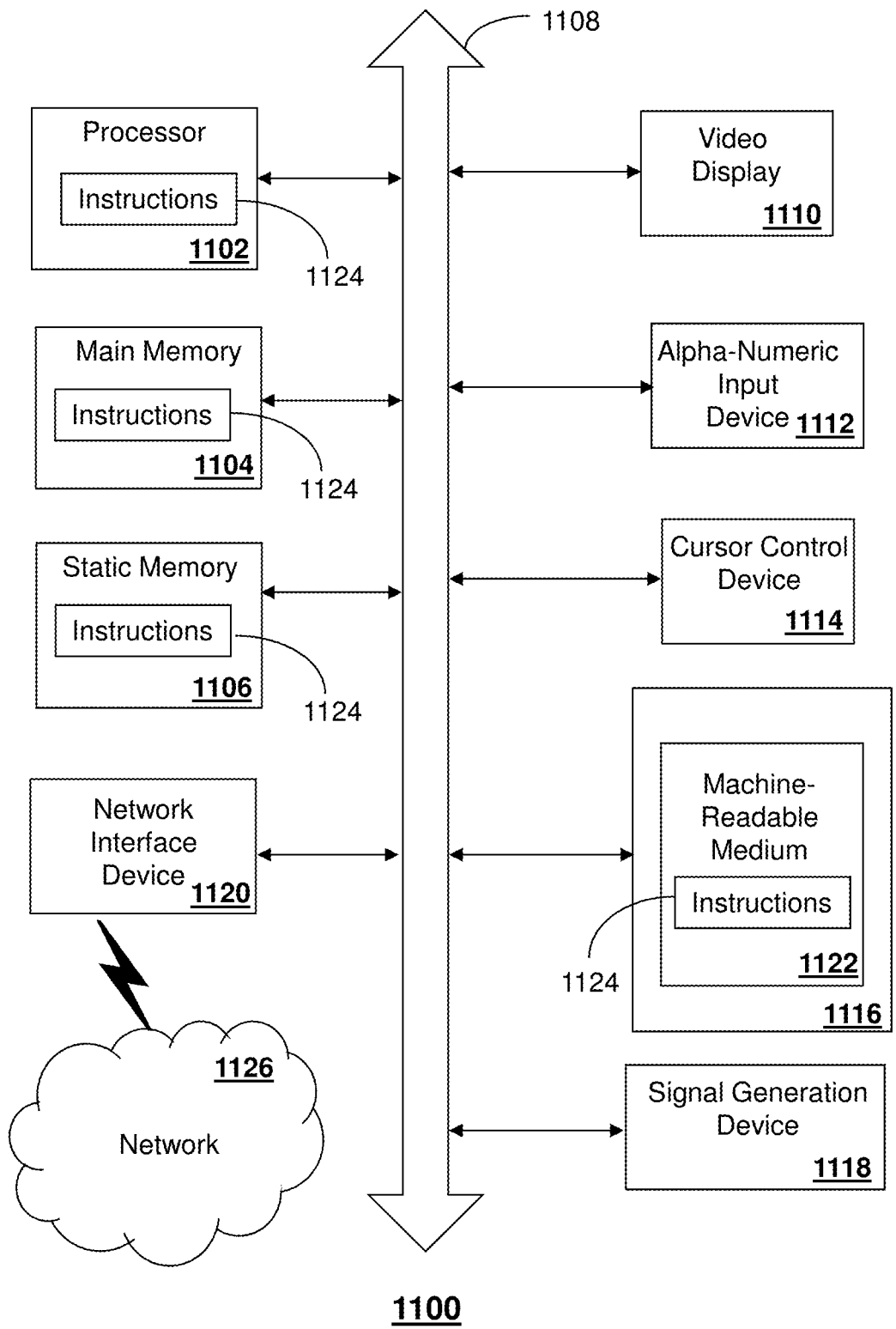
FIG. 11 is a diagrammatic representation of a machine in the form of a computer system within which a set of instructions, when executed, may cause the machine to perform any one or more of the methods described herein.

FIG. 11 depicts an example diagrammatic representation of a machine in the form of a computer system 1100 within which a set of instructions, when executed, may cause the machine to perform any one or more of the methods described above. One or more instances of the machine can operate, for example, as the one or more of connected devices 110, 202, 302, 416, 418-421, 870, the fixed and/or mobile devices 202, 302, 416, 816, 804-808, e.g., hosting an ecosystem client 106, 202, 302, 490, 864, 866 and/or the support management systems 830, 888 and other devices of FIGS. 1-4 and/or 8. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
   a processing system including a processor; and
   a memory that stores executable instructions that, when executed by the processing system, facilitate performance of operations, comprising:
      monitoring, on-premises, a control channel of a service provider network, wherein the control channel comprises control messages that facilitate network access by a plurality of connected devices to a plurality of subscribed service functions that facilitate a delivery of subscribed services to the plurality of connected devices by way of a core portion of the service provider network, wherein the plurality of connected devices are on-premises equipment;
      monitoring, on-premises, a data channel managed by the service provider network and separate from the control channel, wherein the data channel facilitates an exchange of user data between the plurality of connected devices, the core portion of the service provider network and the plurality of subscribed service functions;
      discovering the on-premises equipment based on the monitoring of the control channel;
      facilitating establishing local network connectivity between the processing system and the on-premises equipment; and
      facilitating establishing a common communication channel between the processing system and the core portion of the service provider network, wherein the delivery of subscribed services is based on the exchange of the user data via the common communication channel.

2. The system of claim 1, wherein the operations further comprise:
   maintaining the common communication channel in an active state during periods of inactivity; and
   storing the control messages, the user data, or a combination thereof within an on-premises data store to obtain stored information, wherein the periods of inactivity are characterized by an absence of the exchange of user data via the common communications channel.

3. The system of claim 2, wherein the operations further comprise:
monitoring, on-premises, operations of the plurality of connected devices, the core portion of the service provider network, the plurality of subscribed service functions, or a combination thereof;
detecting an adverse condition based on the monitoring of the operations, wherein the adverse condition interrupts the exchange of the user data; and
facilitating a reestablishment of the exchange of the user data based on the stored information.

4. The system of claim 3, wherein the common communication channel comprises an Internet Protocol (IP) tunnel.

5. The system of claim 2, wherein the maintaining of the common communication channel in the active state comprises forwarding the stored information to a network store via the common communication channel.

6. The system of claim 1, wherein the operations further comprise:
identifying a connected device of the plurality of connected devices based on the monitoring of the control channel, the monitoring of the data channel, or both; and
estimating a power consumption of the connected device of the plurality of connected devices based on the monitoring of the control channel, the monitoring of the data channel, or both.

7. The system of claim 6, wherein the operations further comprise adjusting an operation of the connected device of the plurality of connected devices based on the estimating of the power consumption, wherein the adjusting of the operation reduces a power consumption of the connected device of the plurality of connected devices.

8. A method, comprising:
monitoring, by a processing system including a processor, locally, a control channel of a service provider network, wherein the control channel comprises control messages that facilitate network access by collocated equipment comprising a plurality of connected devices to a plurality of subscribed services by way of a core portion of the service provider network;
monitoring, by the processing system, locally, a data channel managed by the service provider network and separate from the control channel, wherein the data channel facilitates an exchange of user data between the plurality of connected devices, the core portion of the service provider network and the plurality of subscribed services;
identifying, by the processing system, the collocated equipment based on the monitoring of the control channel;
establishing, by the processing system, local network connectivity between the processing system and the collocated equipment; and
establishing, by the processing system, a common transport channel between the processing system and the core portion of the service provider network, wherein the network access to the subscribed services is based on an exchange of the user data via the common transport channel.

9. The method of claim 8, further comprising:
maintaining, by the processing system, the common transport channel in an active state during periods of inactivity; and
storing, by the processing system, the control messages, the user data, or a combination thereof within a local data store to obtain stored information, and wherein the periods of inactivity are characterized by an absence of a data session exchanging user data via the common transport channel.

10. The method of claim 9, further comprising:
monitoring, by the processing system, locally, operations of the plurality of connected devices, the core portion of the service provider network, the plurality of subscribed services, or a combination thereof;
identifying, by the processing system, an adverse condition based on the monitoring of the operations, wherein the adverse condition interrupts the exchange of the user data; and
facilitating, by the processing system, a reestablishment of the exchange of the user data based on the stored information.

11. The method of claim 10, wherein the common transport channel comprises an Internet Protocol (IP) tunnel.

12. The method of claim 9, wherein the maintaining of the common transport channel in the active state comprises forwarding the stored information to a network store via the common transport channel.

13. The method of claim 8, further comprising:
identifying, by the processing system, a connected device of the plurality of connected devices based on the monitoring of the control channel, the monitoring of the data channel, or both; and
estimating, by the processing system, a power consumption of the connected device of the plurality of connected devices based on the monitoring of the control channel, the monitoring of the data channel, or both.

14. The method of claim 13, further comprising adjusting, by the processing system, an operation of the connected device of the plurality of connected devices based on the estimating of the power consumption, wherein the adjusting of the operation reduces a power consumption of the connected device of the plurality of connected devices.

15. A machine-readable storage device, comprising executable instructions that, when executed by a processing system including a processor, facilitate performance of operations, comprising:
monitoring a control plane of a service provider network, wherein the control plane comprises control messages that facilitate network access by local equipment comprising a plurality of connected devices to a plurality of subscribed services by way of the service provider network;
monitoring a data plane managed by the service provider network and separate from the control plane, wherein the data plane facilitates an exchange of user data between the plurality of connected devices, the service provider network and the plurality of subscribed services;
identifying the local equipment based on the monitoring of the control plane;
establishing local network connectivity between the processing system and the local equipment; and
establishing a common communication channel between the processing system and the service provider network, wherein the network access to the subscribed services is based on an exchange of the user data via the common communication channel.

16. The machine-readable storage device of claim 15, wherein the operations further comprise, storing the control messages, the user data, or a combination thereof within a local data store to obtain stored information, wherein the common communications channel, once established, is maintained in an active state during periods of inactivity characterized by no exchange of the user data via the common communication channel.

17. The machine-readable storage device of claim 16, wherein the operations further comprise:
   monitoring operations of the plurality of connected devices, of the service provider network, of the plurality of subscribed services, or of a combination thereof;
   identifying an adverse condition based on the monitoring of the operations, wherein the adverse condition interrupts the exchange of the user data; and
   facilitating a reestablishment of the exchange of the user data based on the stored information.

18. The machine-readable storage device of claim 17, wherein the facilitating of the reestablishment of the exchange of the user data further comprises, forwarding the stored information to a network store via the common communication channel.

19. The machine-readable storage device of claim 15, wherein the operations further comprise:
   identifying a connected device of the plurality of connected devices based on the monitoring of the control plane, the monitoring of the data plane, or both; and
   estimating a power consumption of the connected device of the plurality of connected devices based on the monitoring of the control plane, the monitoring of the data plane, or both.

20. The machine-readable storage device of claim 19, wherein the operations further comprise, adjusting an operation of the connected device of the plurality of connected devices based on the estimating of the power consumption, wherein the adjusting of the operation reduces a power consumption of the connected device of the plurality of connected devices.

* * * * *